(12) United States Patent
Sano et al.

(10) Patent No.: US 8,328,611 B2
(45) Date of Patent: Dec. 11, 2012

(54) GAME PROGRAM AND GAME APPARATUS HAVING OBJECTS THAT FOLLOW A LINE DRAWN BY THE PLAYER

(75) Inventors: Masahiro Sano, Tokyo (JP); Takafumi Ogihara, Tokyo (JP); Yuta Ogura, Tokyo (JP); Kyohei Minato, Tokyo (JP)

(73) Assignee: Nintendo Co., Ltd., Kyoto-shi, Kyoto (JP)

( * ) Notice: Subject to any disclaimer, the term of this patent is extended or adjusted under 35 U.S.C. 154(b) by 308 days.

(21) Appl. No.: 12/773,383

(22) Filed: May 4, 2010

(65) Prior Publication Data

US 2011/0212775 A1 Sep. 1, 2011

(30) Foreign Application Priority Data

Feb. 26, 2010 (JP) ................. 2010-041531

(51) Int. Cl.
*A63F 13/00* (2006.01)
*A63F 9/24* (2006.01)

(52) U.S. Cl. ............... 463/9; 463/7; 463/31; 463/37

(58) Field of Classification Search .......... 463/7, 9, 463/31, 37
See application file for complete search history.

(56) References Cited

U.S. PATENT DOCUMENTS

| 7,828,660 B2* | 11/2010 | Kando et al. | 463/37 |
| 7,927,215 B2* | 4/2011 | Sekimori | 463/32 |
| 2006/0073863 A1* | 4/2006 | Hagiwara | 463/9 |
| 2007/0078006 A1* | 4/2007 | Niida | 463/43 |
| 2010/0022304 A1* | 1/2010 | Katayama et al. | 463/31 |
| 2010/0069132 A1* | 3/2010 | Fujita | 463/9 |
| 2010/0113152 A1* | 5/2010 | Shmuel | 463/36 |
| 2010/0304859 A1* | 12/2010 | Yamada et al. | 463/31 |

FOREIGN PATENT DOCUMENTS

JP 2007-222283 9/2007

* cited by examiner

*Primary Examiner* — Melba Bumgarner
*Assistant Examiner* — Lawrence Galka
(74) *Attorney, Agent, or Firm* — Nixon & Vanderhye P.C.

(57) ABSTRACT

A game apparatus has a touch panel for designating an arbitrary position within a screen on which a plurality of moving objects are arranged. A CPU repetitively detects the position designated via the touch panel, draws a line along the detected positions on the screen, every time that the detected position is in contact with any object within the screen, aligns the object on the line every time that the detected position is in contact with any object on the screen, moves the object aligned on the line to a trailing end direction of the line at a velocity V1 with the drawn line erasing from a leading end at a velocity V2 (>V1) and executes clearing processing in a case that an array of the objects on the line satisfies a matching condition with a goal condition array before the leading end of the line catches up with the object on the line.

19 Claims, 22 Drawing Sheets

FIG. 6
(A)
| COLOR OF TENKUN | RED |  |
|---|---|---|
| | BLUE |  |
| | YELLOW |  |
| | PURPLE (RED AND BLUE) |  |
| | GREEN (BLUE AND YELLOW) |  |
| | ORANGE (YELLOW AND RED) |  |
| | GRAY |  |
(B)
| COLOR OF PUTITENKUN | RED |  |
|---|---|---|
| | BLUE |  |
| | YELLOW |  |

FIG. 7

| KIND OF TENKUN (WAY OF MOVEMENT) | NORMAL |
| --- | --- |
| | PUTITENKUN |
| | RUNING AWAY |
| | APPROACHING |
| | JUMPING |
| KIND OF MOPPUN (WAY OF MOVEMENT) | MOVING |
| | STOPPING |
| KIND OF FIELD | NORMAL |
| | PARTLY DARKNESS |
| | ENTIRELY DARKNESS |

| GOAL CONDITION (ARRAY OF TENKUN) |
| --- |
| (LEADING END) BLUE ⇒ RED |

(B) 84

| LIST-OF-TENKUN-ON-LINE |
| --- |
| ABSENCE |
| ▼ |
| BLUE |
| ▼ |
| (LEADING END) BLUE ⇒ RED |

FIG. 9 (A)
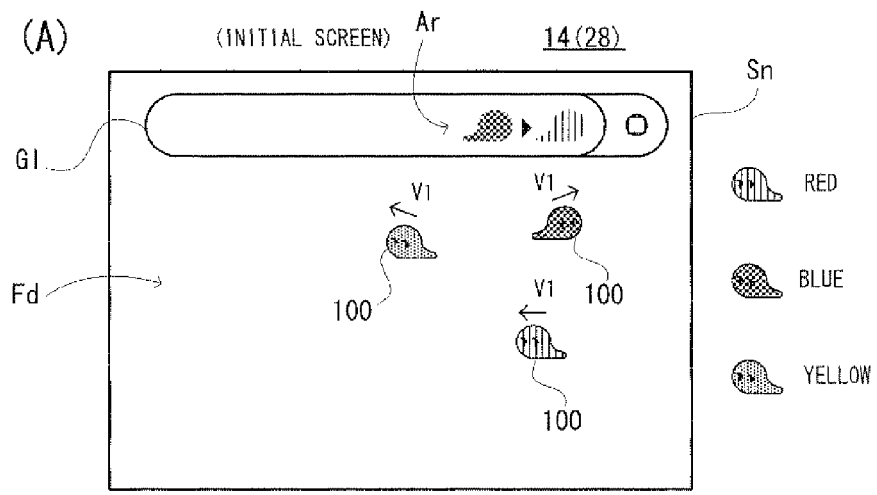
(B)
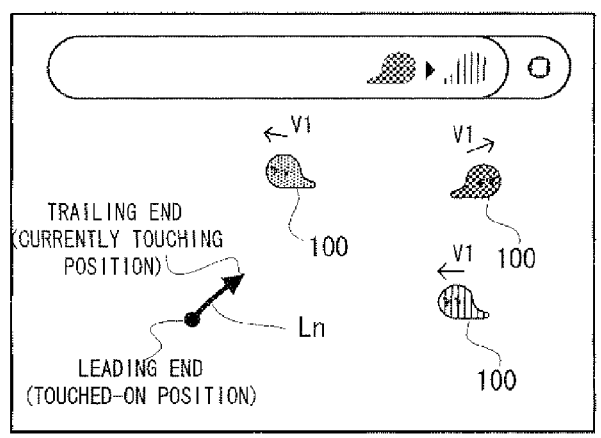
(C)
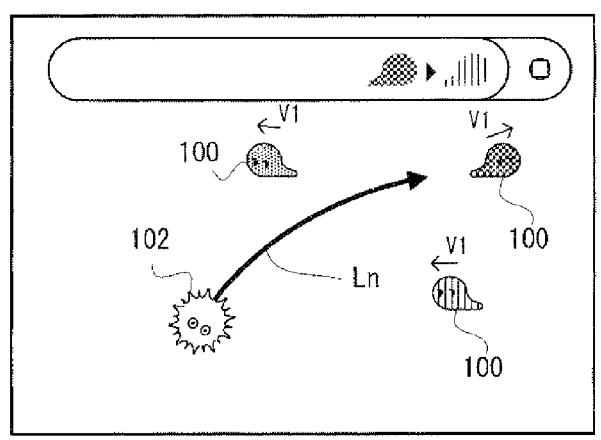

FIG. 10 (A)
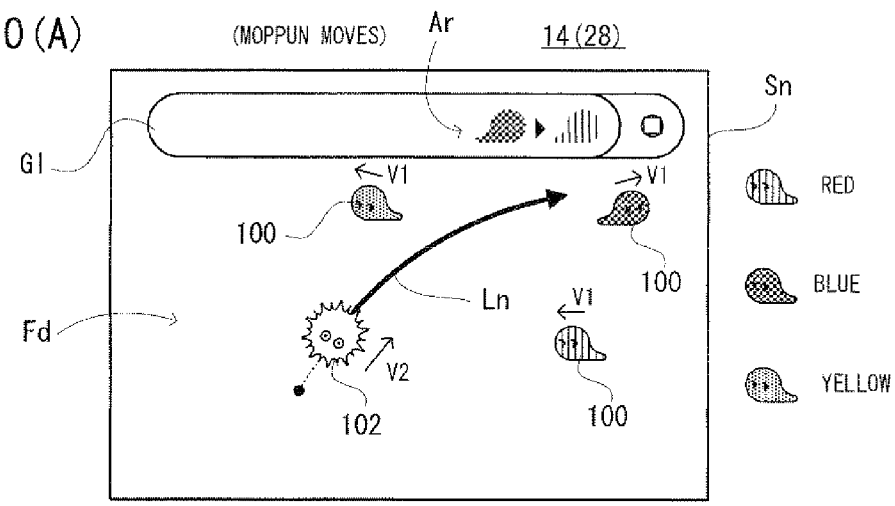
(B)
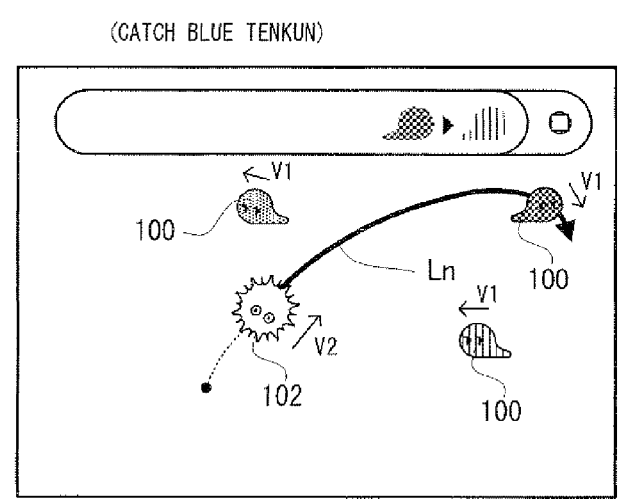
(C)
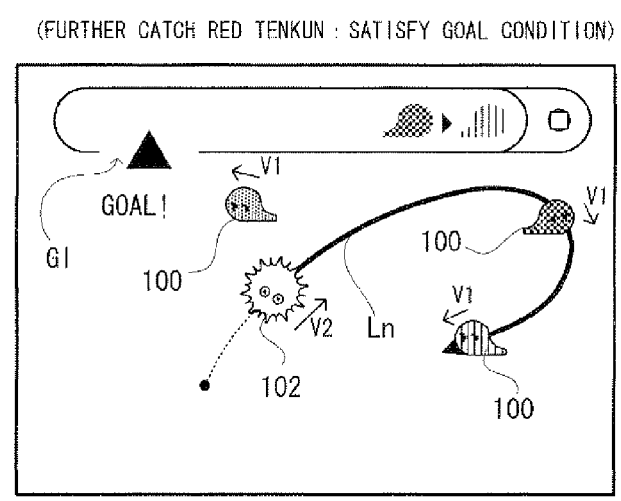

FIG. 11 (A)
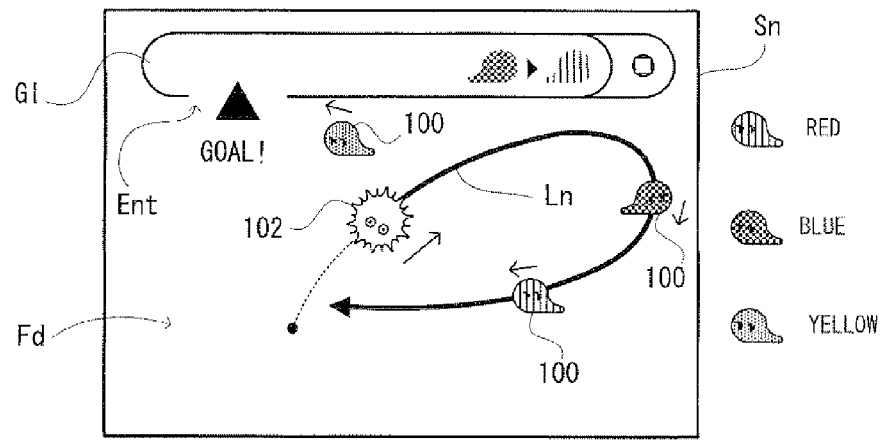
(B)
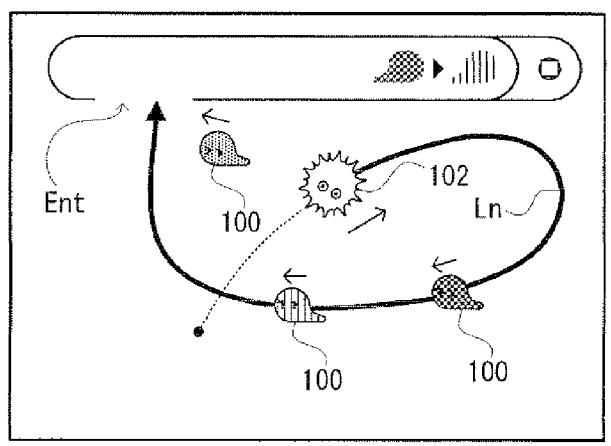
FIG. 12
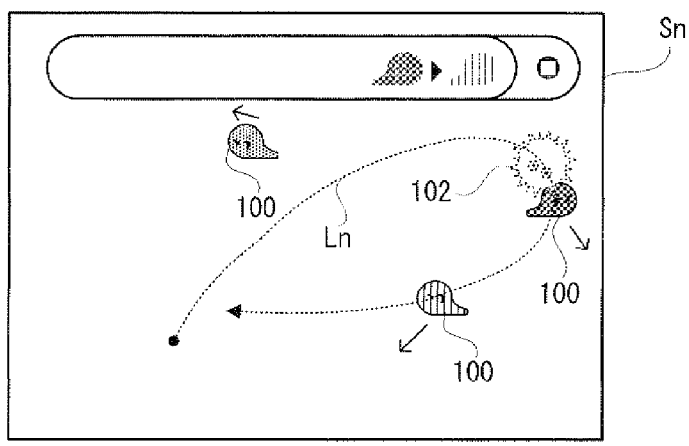

FIG. 14
(A) (TENKUN IS SEPARATED INTO PUTITENKUNS)
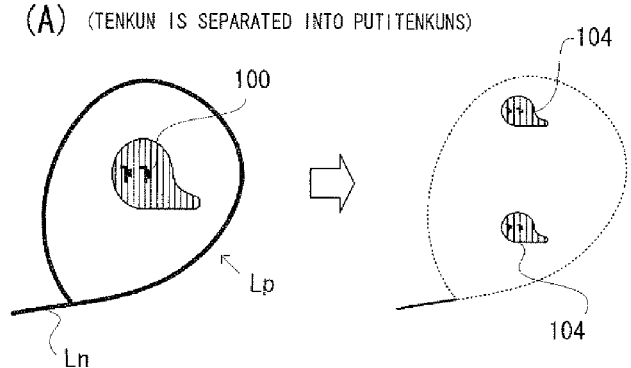
(B) (PUTITENKUNS ARE COMBINED INTO TENKUN)
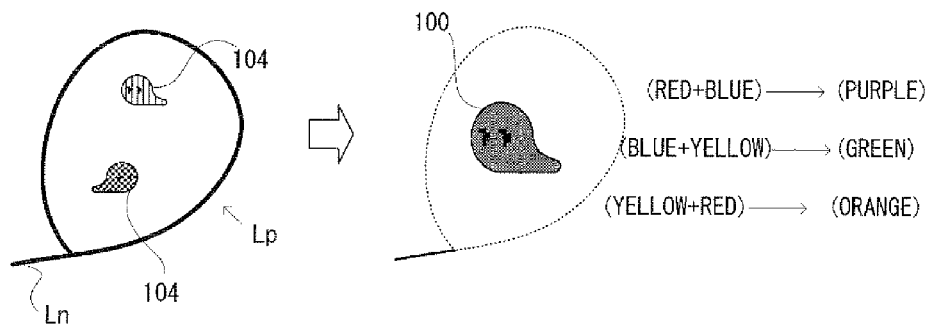
(RED+BLUE) ⟶ (PURPLE)
(BLUE+YELLOW) ⟶ (GREEN)
(YELLOW+RED) ⟶ (ORANGE)
(C) (TEMPORARILY CHANGE TENKUN INTO GRAY)
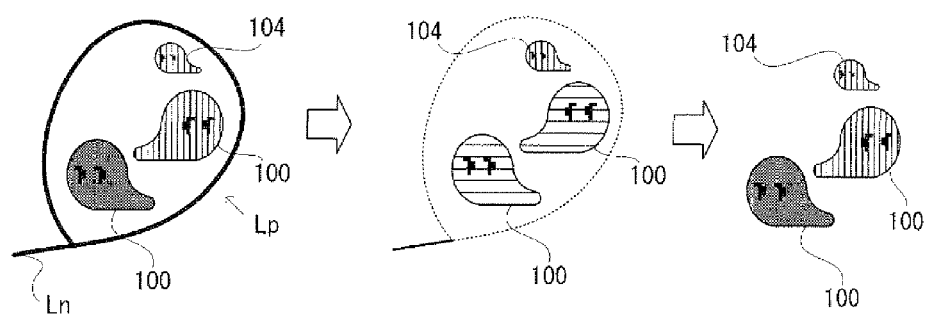

GAME PROGRAM AND GAME APPARATUS HAVING OBJECTS THAT FOLLOW A LINE DRAWN BY THE PLAYER

CROSS REFERENCE OF RELATED APPLICATION

The disclosure of Japanese Patent Application No. 2010-41531 is incorporated herein by reference.

BACKGROUND OF THE INVENTION

1. Field of the Invention

The present invention relates to a game program and a game apparatus. More specifically, the present invention relates to a game program and a game apparatus which align a plurality of objects in a predetermined order according to an operation with a pointing device for designating an arbitrary point within a screen.

2. Description of the Related Art

An example of this kind of a conventional game program and a conventional game apparatus is disclosed in Japanese Patent Application Laid-Open No. 2007-222283. In the related art, according to a mouse operation, a non player object is sequentially connected to a player object.

More specifically, a series of game processing is repetitively executed. That is, the player object is moved according to mouse input information, and hitting between the player object and the non player object is determined, and when it is determined that hitting is made, if the non player object is not a predetermined state, the non player object is changed to the predetermined state whereas if the non player object is the predetermined state, the non player object is connected to the player object. Furthermore, depending on the number of connections, ability is given to the player object, and if a connection pattern matches a target pattern, the game is to be cleared.

However, in the aforementioned related art, the current mouse input information is used in the game processing, but the record of the mouse input information up to this time, that is, a locus of the mouse was not especially used. By using the locus, it is expected that a strategic characteristic and savor of the game is enhanced.

SUMMARY OF THE INVENTION

Therefore, it is a primary object of the present invention to provide a novel game program and a novel game apparatus.

Another object of the present invention is to provide a game program and a game apparatus which are able to heighten a strategic characteristic and savor of the game of aligning a plurality of objects in a predetermined order by using a locus of points designated by a position designator.

The present invention adopts following configurations in order to solve the above-described problems.

A first invention is a game program, and causes a computer of a game apparatus having a position designator which designates an arbitrary position within a screen on which a plurality of moving objects are arranged to function as: a position detector which repetitively detects a position designated by the position designator; a line drawer which draws a line on the screen along the position detected by the position detector; an object aligner which aligns, every time that the position detected by the position detector satisfies a contact condition with any object within the screen, the object on the line; an object mover which moves the object aligned on the line by the object aligner toward a trailing end direction of the line at a first velocity; a line eraser which erases the line drawn by the line drawer from a leading end at a second velocity higher than the first velocity; and a clearer which, before the leading end of the line catches up with the object on the line, if an array of the objects on the line satisfies a matching condition with a predetermined array, in association with the processing by the line eraser and the object mover, executes clear processing.

In the first invention, when the player sequentially designates a moving object on a screen by a position designator, the computer of the game apparatus draws a line along the designated positions, that is, the locus on the screen, aligning the designated object on the line. Furthermore, the object is moved toward the trailing end direction on the line while the line is erased from a leading end at a velocity (V2>V1) higher than a moving velocity (V1) of the object. Then, before the leading end of the line catches up with an object on the line, when a predetermined object array is formed on the line, clearing processing is executed.

According to the first invention, a player has to designate an object by the position designator, draw a line, and align a plurality of objects in a predetermined order on the line at the same time, and therefore, it is possible to heighten a strategic characteristic and savor of the game of aligning a plurality of objects in a predetermined order.

A second invention is a game program according to the first invention, and a goal area is further arranged on the screen, the clearer executes the clearing processing before the leading end of the line catches up with the object on the line, if an array of the objects on the line satisfies a matching condition with the predetermined array, when the position detected by the position detector satisfies the contact condition with the goal area.

In the second invention, the clearing processing is executed when the array satisfies a matching condition, and the position satisfies a contact condition.

According to the second invention, the player has to be in contact with the goal area in addition to alignment of objects in the predetermined order, capable of enhancing a strategic characteristic and savor.

A third invention is a game program according to the first invention, and the game program causes a computer of the game apparatus to further function as a remover which removes, when the line drawn by the line drawer is intersected to make a loop, the loop.

According to the third invention, when the line is intersected, the loop part is removed, preventing an intersection of the line from occurring on the screen. The removal of the loop by intersection of the line is contributed to a strategic characteristic and savor.

A fourth invention is a game program according to the third invention, and the game program causes a computer of the game apparatus to further function as a releaser which releases an object existing on the loop in association with a removal of the loop by the remover.

In the fourth invention, in accordance with the removal of the loop, objects on the loop are released.

According to the fourth invention, if the objects are erroneously aligned, the line is intentionally intersected to release the objects on the loop, and an object can be aligned newly, capable of enhancing a strategic characteristic and savor.

A fifth invention is a game program according to any one of the first to fourth inventions, and the plurality of objects are given different colors, and the array is an array in relation to colors.

In the fifth invention, the player aligns the objects according to a predetermined order of colors, such as "red, blue, and yellow" in this order. Here, the array may be related to a size, such as "large, middle, small", and a shape, such as "circle, triangle, quadrangle", for example, or a combined one other than the colors. In addition, any aligning manner is appropriate if it is a visually identifiable one, such as a design, brightness, transparency, etc.

A sixth invention is a game program according to the fifth invention, and the game program causes a computer of the game apparatus to further function as a separator which separates each of the objects positioned within the loop into a plurality of objects when the line drawn by the line drawer is intersected to make a loop.

In the sixth invention, when a line is intersected to make a loop, each object positioned in the area encircled by the loop is separated into a plurality of objects.

According to the sixth invention, the player intersects the line so as to encircle a desired object to thereby separate the object into a plurality of objects.

A seventh invention is a game program according to the fifth or the sixth invention, and the game program causes a computer of the game apparatus to further function as a combiner which combines a plurality of objects positioned within the loop into one when the line drawn by the line drawer is intersected to make a loop.

In the seventh invention, when the line is intersected to make a loop, a plurality of objects positioned within the area encircled by the loop are combined into one.

According to the seventh invention, the player intersects the line so as to encircle a plurality of desired objects to thereby combine the objects into one.

An eighth invention is a game program according to the seventh invention, and the combiner gives, when the plurality of objects are combined into one, a mixed color obtained by mixing colors of the plurality of objects to the combined object.

In the eighth invention, a color of the object after the combination is a mixed color of the colors of the plurality of objects before the combination.

According to the eighth invention, it is possible to give various colors to the objects.

Additionally, in a certain embodiment, the line is intersected to encircle a first object (tenkun) to separate the first object into two second objects (putitenkuns), and the line is intersected to encircle the two second objects to combine the two second objects into a first object. For example, in a case that an array of "blue, violet, and red" is made with the first object, when only two colors of, that is, red and blue first objects exist on the screen, the red first object is separated into two second objects, and the blue first object is separated into two second objects, and each one of the obtained two red and blue second objects are combined. Thus, a violet first object can be obtained, so that it is possible to make the array of "blue, violet, and red" with the first object.

A ninth invention is a game program according to the first or the third invention, and a length restriction is set to the line drawn by the line drawer, and the game program causes a computer of the game apparatus to further function as a game ender which performs game end processing when the length of the line drawn by the line drawer exceeds the length restriction.

In the ninth invention, if the length of the line exceeds the length restriction, the game is over.

According to the ninth invention, the player further has to control a drawing velocity of the line, capable of heightening a strategic characteristic and savor. Furthermore, in combination with the aforementioned third invention, the player can use the technique of removing a loop by intersecting the line in order to adjust the length of the line, so that it is possible enhance a strategic characteristic and savor.

A tenth invention is a game program according to the first invention, and at least one object within the screen moves so as to run away from the position detected by the position detector.

In the tenth invention, an object which the player tries to designate may run away. According to the tenth invention, the player can use the technique of drawing a line so as to interrupt the movement of the object, so that it is possible enhance a strategic characteristic and savor.

An eleventh invention is a game program according to the first invention, and at least one object within the screen moves so as to approach the position detected by the position detector.

In the eleventh invention, as a result of another object other than a desired object approaching, the player may be hard to designate the desired object.

According to the eleventh invention, the player can use the technique of drawing a line so as to interrupt the movement of the object, so that it is possible enhance a strategic characteristic and savor.

A twelfth invention is a game program according to the first invention, and when it is in contact with a periphery of the screen, the line, or another object, at least one object within the screen turns to a reverse direction, and at least another object within the screen moves so as to go through the periphery of the screen, the line, or another object.

In the twelfth invention, when some objects are likely to be in contact with a periphery of the screen, the line, or another object, a certain object may turn to a reverse direction, but another object may go through them.

According to the twelfth invention, an object which stays for a short time appears on the screen, so that it is possible to increase difficulty of the game.

A thirteenth invention is a game program according to the fifth invention, and a dark area is arranged at least a part of the screen, and an object that enters the dark area is unidentifiable in color.

According to the thirteenth invention, the player has to deal with storage of the color of the object which is likely to enter the dark area, it is possible to enhance a strategic characteristic and savor.

A fourteenth invention is a game program according to the thirteenth invention, and a specific part of the object is viewable even in the dark area.

According to the fourteenth invention, even if there is an object within the dark area, the existence can be perceived even if the color cannot be identified, capable of reducing difficulty of the game.

A fifteenth invention is a game program according to the thirteenth invention, and a viewable area is ensured at a line drawn in the dark area and around the line.

According to the fifteenth invention, the object aligned on the line and the object positioned around the line is viewable, and the color is also identifiable, capable of reducing the difficulty of the game.

A sixteenth invention is a game program according to the fifteenth invention, and the viewable area is expanded at a trailing end of the line.

According to the sixteenth invention, the viewable area is expanded at the trailing end of the line, that is, the position currently designated by the player, so that is possible to reduce the difficulty of the game.

Here, in the present invention, a storage storing the game program according to the above-described first to sixteenth inventions is included as well.

A seventeenth invention is a game apparatus, and comprises a position designator which designates an arbitrary position within a screen within a screen on which a plurality of moving objects are arranged, a position detector which repetitively detects a position designated by the position designator; a line drawer which draws a line on the screen along the position detected by the position detector; an object aligner which aligns, every time that the position detected by the position detector satisfies a contact condition with any object within the screen, the object on the line; an object mover which moves the object aligned on the line by the object aligner toward a trailing end direction of the line at a first velocity; a line eraser which erases the line drawn by the line drawer from a leading end at a second velocity higher than the first velocity; and a clearer which, before the leading end of the line catches up with the object on the line, if an array of the objects on the line satisfies a matching condition with a predetermined array, in association with the processing by the line eraser and the object mover, executes clear processing.

An eighteenth invention is game method to be executed by a game apparatus having a position designator which designates an arbitrary position within a screen on which a plurality of moving objects are arranged, comprises: a position detecting step which repetitively detects a position designated by the position designator; a line drawing step which draws a line on the screen along the position detected by the position detecting step; an object aligning step which aligns, every time that the position detected by the position detecting step satisfies a contact condition with any object within the screen, the object on the line; an object moving step which moves the object aligned on the line by the object aligning step toward a trailing end direction of the line at a first velocity; a line erasing step which erases the line drawn by the line drawing step from a leading end at a second velocity higher than the first velocity; and a clearing step which, before the leading end of the line catches up with the object on the line, if an array of the objects on the line satisfies a matching condition with a predetermined array, in association with the processing by the line erasing step and the object moving step, executes clear processing.

In the seventeenth or the eighteenth invention as well, similar to the first invention, it is possible to heighten a strategic characteristic and savor of the game of aligning a plurality of objects in a predetermined order.

According to the present invention, it is possible to implement a game program and a game apparatus which are able to heighten a strategic characteristic and savor of the game of connecting a plurality of objects in a predetermined order by using a locus of points designated by the pointing device.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 3(A) shows one side surface in a close state, FIG. 3(B) shows a top surface in the close state, FIG. 3(C) shows the other side surface in the close state, and FIG. 3(D) shows a bottom surface in the close state;

FIG. 6 is a table showing colors of objects, FIG. 6(A) shows colors of a tenkun, and FIG. 6(B) shows colors of a putitenkun;

FIG. 7 is a table indicating the kinds of the objects and fields;

FIG. 8 is information for determining whether or not a predetermined array is completed on the line, FIG. 8(A) shows an array of tenkuns corresponding to a goal condition, and FIG. 8(B) shows a list-of-tenkun-on-a line;

FIG. 9 is an illustrative view showing a development of the game in a certain stage, in which the game screen changes as in (A) to (C);

FIG. 10 is an illustrative view showing a development sequel to FIG. 9, in which the game screen chances as in (A) to (C);

FIG. 11 is an illustrative view showing a development sequel to FIG. 10, in which the game screen chances as in (A) to (B);

FIG. 12 is an illustrative view showing another development of the game, and is compared with FIG. 11(A);

FIG. 14 is an illustrative view showing separation, generation and change in color to gray by using intersection of the line, and FIG. 14(A) shows separation into putitenkuns from a tenkun, FIG. 14 (B) shows a combination into a tenkun from putitenkuns, and FIG. 14 (C) shows that a tenkun changes in color to gray;

DETAILED DESCRIPTION OF THE PREFERRED EMBODIMENTS

Figure 1:
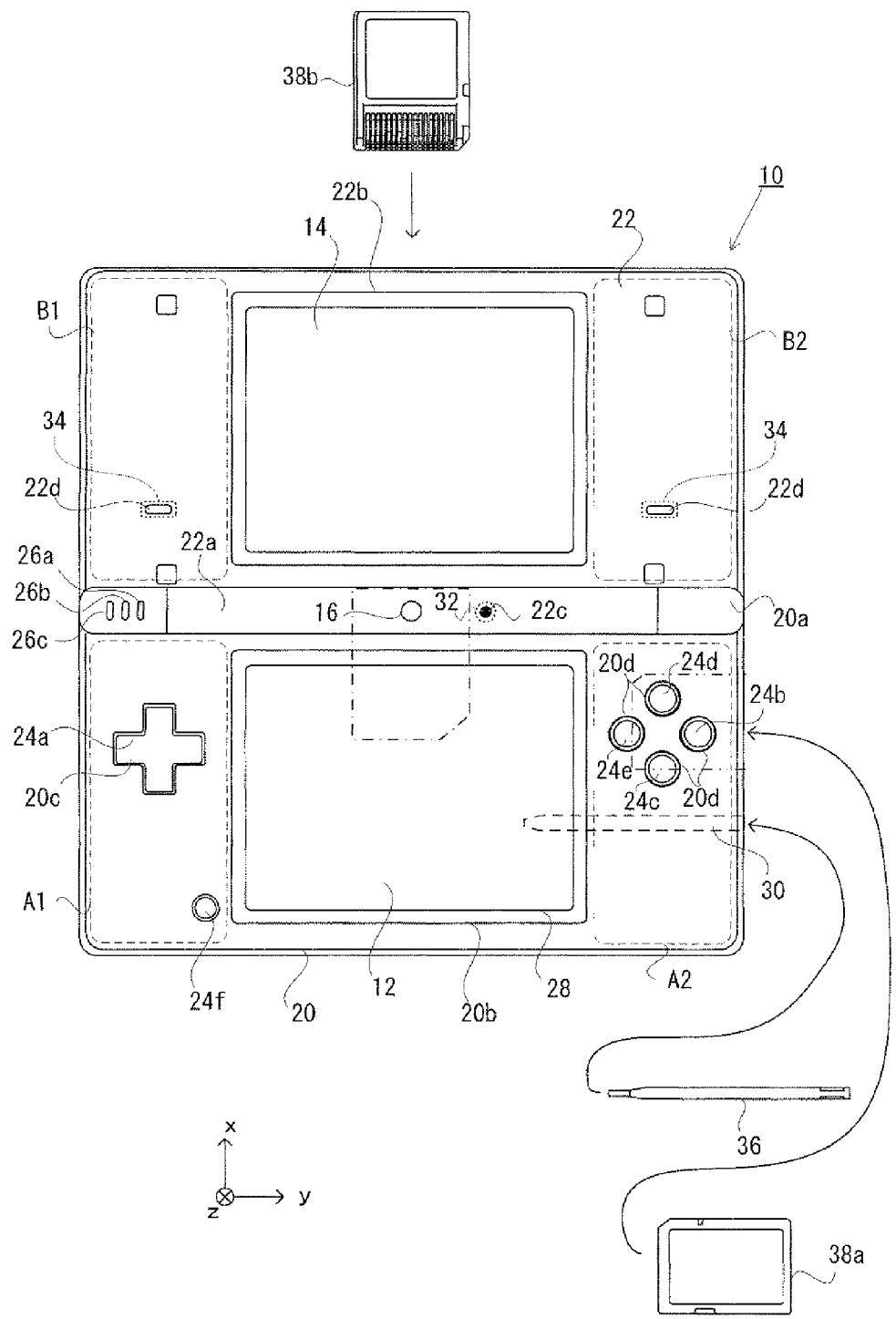
FIG. 1 is an external view of a game apparatus of one embodiment of the present invention showing a front surface in an open state.
Figure 2:
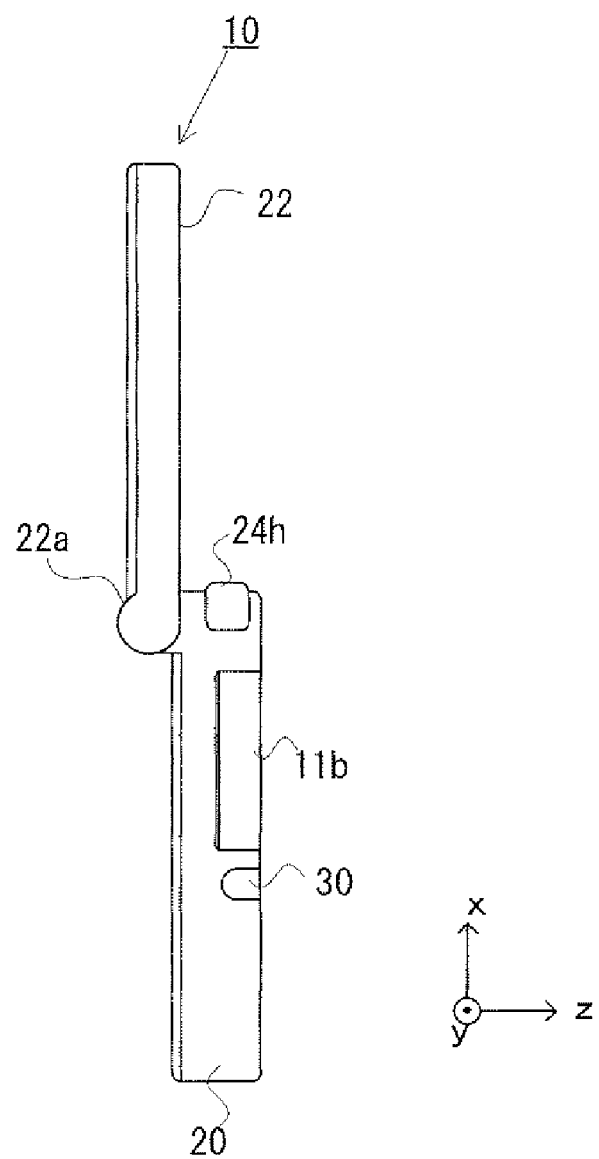
FIG. 2 is an external view of the game apparatus showing a side surface thereof in the open state.
Figure 3:
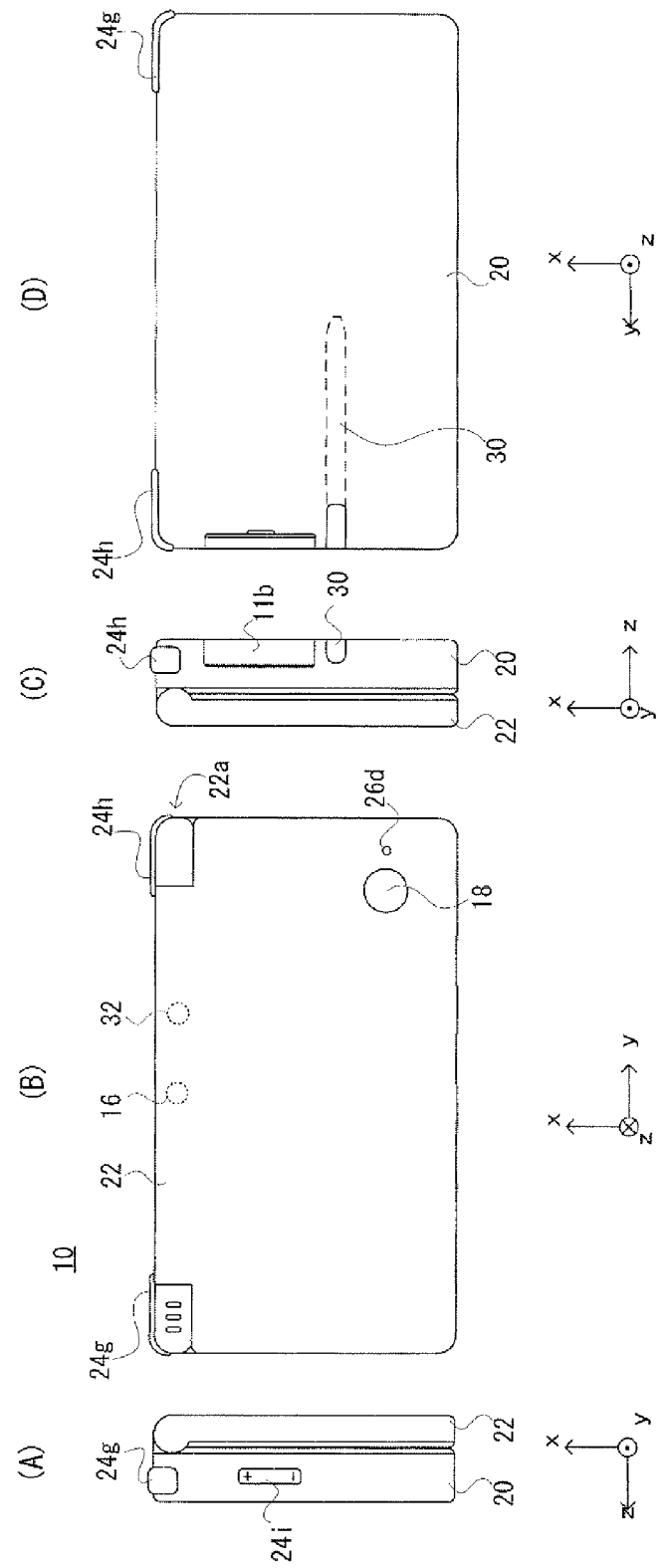
FIG. 3 is an external view of the game apparatus.

In FIG. 1 to FIG. 3, an external view of a game apparatus 10 of one embodiment of the present invention is shown. The game apparatus 10 is a foldable game apparatus, and each of FIG. 1 and FIG. 2 shows the game apparatus 10 in a opened state (open state), and FIG. 3 shows the game apparatus 10 in a closed state (close state). Furthermore, FIG. 1 is a front view of the game apparatus 10 in the open state, and FIG. 2 is a side view of the game apparatus in the open state. The game apparatus 10 has two displays (LCDs 12 and 14) and two cameras (cameras 16 and 18), can image an image with the camera, display the imaged image and store the data of the imaged image.

The game apparatus 10 is constructed small enough to be held by the user with both of the hands or one hand even in the open state.

The game apparatus 10 has two housings of a lower housing 20 and an upper housing 22. The lower housing 20 and the upper housing 22 are connected with each other so as to be opened or closed (foldable). In this embodiment, the respective housings 20 and 22 are formed in the form of plate of a horizontally long rectangular, and are rotatably connected with each other at the long sides of both of the housings.

The upper housing 22 is supported pivotally at a part of the upper side of the lower housing 20. This makes the game apparatus 10 to take a close state (the angle formed by the lower housing 20 and the upper housing 22 is about 0° (see FIG. 3)) and an open state (the angle formed by the lower housing 20 and the upper housing 22 is about 180° (see FIG. 2)). The user generally uses the game apparatus 10 in the open state, and keeps the game apparatus 10 in the close state when not using the game apparatus 10. Furthermore, the game apparatus 10 can maintain the angle formed by the lower housing 20 and the upper housing 22 at an arbitrary angle between the close state and the open state by friction, etc. exerted on the hinge as well as the close state and the open state as described above. That is, the upper housing 12 can be fixed with respect to the lower housing 14 at an arbitrary angle.

First, the configuration of the lower housing 20 is first explained. As shown in FIG. 1, the game apparatus 10 has the lower LCD (liquid crystal display) 12. The lower LCD 12 takes a horizontally-long shape, and is arranged such that the direction of the long side is coincident with the long side of the lower housing 20. The lower LCD 12 is provided on an inner surface of the lower housing 20. Accordingly, if the game apparatus 10 is not to be used, the game apparatus 10 is in the close state to thereby prevent the screen of the lower LCD 12 from being soiled, damaged, and so forth. Additionally, in this embodiment, an LCD is used as a display, but other arbitrary displays, such as a display utilizing EL (Electro Luminescence), for example, may be used. Furthermore, the game apparatus 10 can employ a display of an arbitrary resolution. Additionally, in a case that the game apparatus 10 is used as an imaging device, the lower LCD 12 is used for displaying, in real time, images (through image) imaged by the camera 16 or 18.

The inner surface of the lower housing 20 is formed to be approximately planar. At the center of the inner surface, an opening 20b for exposing the lower LCD 12 is formed. At the left of the opening 20b (in the negative direction of the y axis in the drawing), an opening 20c is formed, and at the right of the opening 20b, an opening 20d is formed. The openings 20b and 20c are for exposing the respective keytops (the top surfaces of the respective buttons 24a to 24e). Then, the screen of the lower LCD 12 provided inside the lower housing 20 is exposed from the opening 20b, and the respective keytops are exposed from the openings 20c and 20d. Thus, on the inner surface of the lower housing 20, on both sides of the opening 20b for the lower LCD 12 set at the center, non-screen areas (dotted line areas A1 and A2 shown in FIG. 1. More specifically, areas for arranging the respective buttons 24a to 24e; button arranging area) are provided.

On the lower housing 20, the respective buttons 24a to 24i and a touch panel 28 are provided as input devices. As shown in FIG. 1, the direction input button 24a, the button 24b, the button 24c, the button 24d, the button 24e, and the power button 24f out of the respective buttons 24a to 24i are provided on the inner surface of the lower housing 20. The direction input button 24a is utilized for a selecting operation, for example, and the respective buttons 24b to 24e are utilized for a decision operation and a cancel operation, for example. The power button 24f is utilized for turning on/off the power of the game apparatus 10. Here, the direction input button 24a and the power button 24f are provided on one side (left side in FIG. 1) of the lower LCD 12 provided at substantially the center of the lower housing 20, and the buttons 24b to 24e are provided at the other side (right side in FIG. 1) of the lower LCD 12. The direction input button 24a and the buttons 24b to 24e are utilized for performing various operations to the game apparatus 10.

FIG. 3(A) is a left side view of the game apparatus 10 in the close state, FIG. 3(B) is a front view of the game apparatus 10, FIG. 3(C) is a right side view of the game apparatus 10, and FIG. 3(D) is a rear view of the game apparatus 10. As shown in FIG. 3(A), the volume button 24i is provided on the left side surface of the lower housing 20. The volume button 24i is utilized for adjusting a volume of a speaker 34 furnished in the game apparatus 10. Furthermore, as shown in FIG. 3(D), the button 24h is provided at the right corner of the upper side surface of the lower housing 20. The button 24g is provided at the left corner of the upper side surface of the lower housing 20. The both of the buttons 24g and 24h are utilized for performing an imaging instructing operation (shutter operation) on the game apparatus 10, for example. Alternatively, both of the buttons 24g and 24h may be made to work as shutter buttons. In this case, a right-handed user can use the button 24h, and a left-handed user can use the button 24g, capable of improving usability for both of the users. Additionally, the game apparatus 10 can constantly make both of the buttons 24g and 24h valid as shutter buttons, or the game apparatus 10 is set to be a right-handed use or a left-handed use (the setting is input by the user according to a menu program, etc. and the set data is stored), and when the right-handed use is set, only the button 24h is made valid, and when the left-handed use is set, only the button 24g may be made valid.

As shown in FIG. 1, the game apparatus 10 is further provided with the touch panel 28 as an input device other than the respective operation buttons 24a to 24i. The touch panel 28 is set to the screen of the lower LCD 12. In this embodiment, the touch panel 28 is a touch panel of a resistance film system. Here, the touch panel can employ arbitrary push type touch panels over the resistance film system. In this embodiment, as the touch panel 28, a touch panel having the same resolution (detection accuracy) as that of the lower LCD 12 is utilized. The resolution of the touch panel 28 and the resolution of the lower LCD 12 are not necessarily coincident with each other. Furthermore, at the right side surface of the lower housing 20, an inserting portion 30 (shown by a dotted line in FIG. 1 and FIG. 3(D)) is provided. The inserting portion 30 can accommodate a touch pen 36 utilized for performing an operation on the touch panel 28. It should be noted that an input to the touch panel 28 is generally performed by means of the touch pen 36, but can be performed on the touch panel 28 with fingers of the user besides the touch pen 36.

As shown in FIG. 2 and FIG. 3 (D), on the right side surface of the lower housing 20, an openable and closeable cover portion 11b is provided. Inside the cover portion 11b, a loading slot (dashed line) for loading a memory card 38a and a connector (not illustrated) for electrically connecting the game apparatus 10 and the memory card 38a are provided.

The memory card 38a is detachably attached to a connector. The memory card 38a is used for storing (saving) image data imaged by the game apparatus 10, for example.

Furthermore, on the top surface of the lower housing 20, a loading slot (chain double-dashed line) 38b for loading a memory card and a connector (not shown) for electrically connecting the game apparatus 10 and the memory card 38b are provided. The memory card 38b is utilized for storing a program operated in the game apparatus 10, for example.

As shown in FIG. 1, at the left of the shaft portion 20a of the lower housing 20, three LEDs 26a to 26c are attached. Here, the game apparatus 10 can perform a wireless communication with another appliance and another game apparatus in the same kind (not shown), and the first LED 26a lights up when a wireless communication is established. The second LED 26b lights up while the game apparatus 10 is recharged. The third LED 26c lights up when the main power supply of the game apparatus 10 is turned on. Accordingly, by the three LEDs 26a to 26c, it is possible to inform the user of a communication-established state, a charge state, and a main power supply on/off state of the game apparatus 10.

Figure 4:
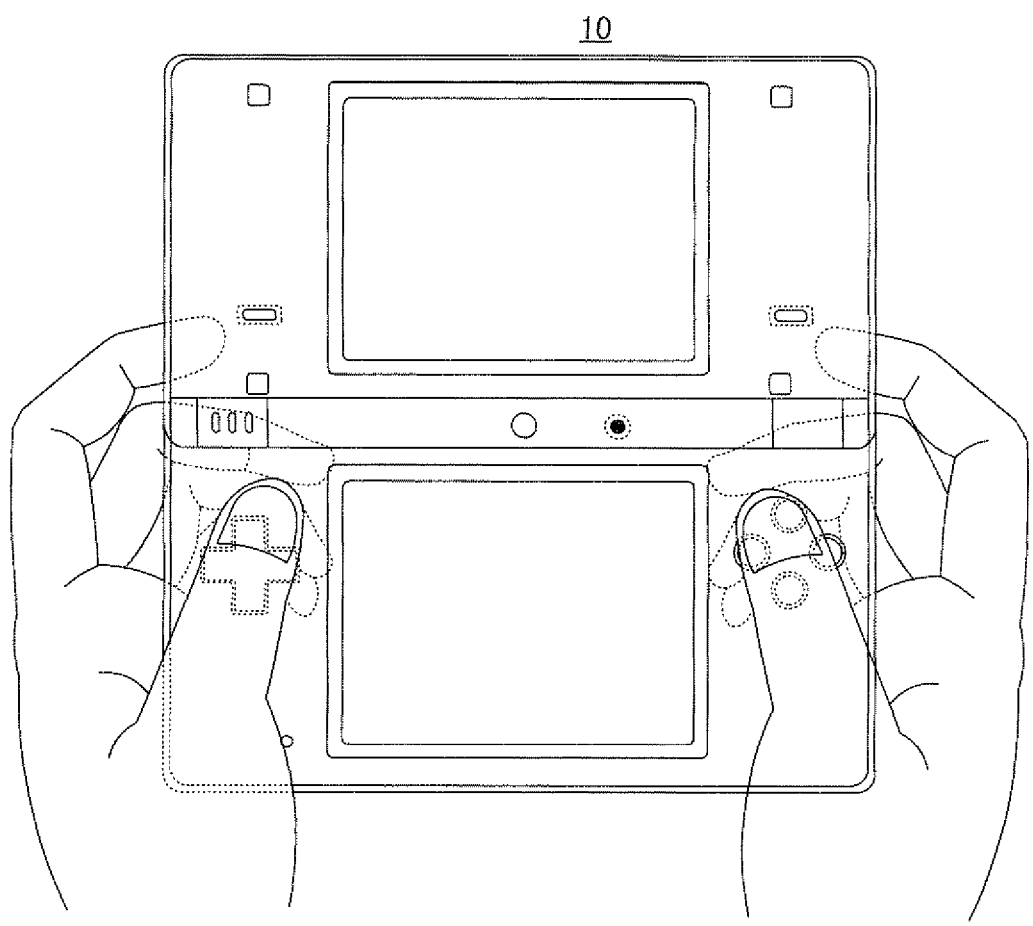
FIG. 4 is an illustrative view showing a state that the game apparatus is held by the user.

As described above, the lower housing 20 is provided with the input device (touch panel 28 and respective buttons 24a to 24i) for performing an operation input to the game apparatus 10. Accordingly, when utilizing the game apparatus 10, the user can perform an operation on the game apparatus 10 while holding the lower housing 20. FIG. 4 shows a situation in which the user holds the game apparatus 10 with both of the hands. As shown in FIG. 4, the user holds the side surface and the outer surface (surface opposite to the inner surface) of the lower housing 20 with the palms, the middle fingers, the ring fingers and the little fingers of both of the hands in a state that the respective LCDs 12 and 14 are directed to the user. By holding the game apparatus 10 in such a manner, the user can perform operations as to the respective buttons 24a to 24e with the thumbs, and perform operations as to the buttons 24g and 24h with the index fingers while holding the lower housing 20.

On the other hand, the upper housing 22 has a configuration for imaging an image (camera), and a configuration for displaying the imaged image (display). The configuration of the upper housing 22 is explained below.

As shown in FIG. 1, the game apparatus 10 has the upper LCD 14. The upper LCD 14 is set to the upper housing 22. The upper LCD 1.4 takes a horizontally-long shape, and is arranged such that the direction of the long side is coincident with the long side of the upper housing 22. The upper LCD 14 is provided on the inner surface of the upper housing 2 (the inner surface when the game apparatus 10 is in the close state). Accordingly, if the game apparatus 10 is not to be used, the game apparatus 10 is set to the close state to thereby prevent the screen of the upper LCD 14 from being soiled, damaged, and so forth. Here, similar to the lower LCD 12, in place of the upper LCD 14, a display with an arbitrary form and an arbitrary resolution may be utilized. It should be noted that in another embodiment, a touch panel may be provided on the upper LCD 14 as well.

Furthermore, the game apparatus 10 has the two cameras 16 and 18. The respective cameras 16 and 18 are housed in the upper housing 22. As shown in FIG. 1, the inward camera 16 is attached to the inner surface of the upper housing 22. On the other hand, as shown in FIG. 3(B), the outward camera 18 is attached to the surface being opposed to the surface to which the inward camera 16 is provided, that is, the outer surface of the upper housing 22 (outer surface when the game apparatus 10 is in the close state). Thus, the inward camera 16 can image a direction to which the inner surface of the upper housing 22 is turned, and the outward camera 18 can image a direction opposite to the imaging direction of the inward camera 16, that is, a direction to which the outer surface of the upper housing 22 is turned. As described above, in this embodiment, the two cameras 16 and 18 are provided so as to make the imaging directions opposite to each other. Accordingly, the user can image the two different directions without shifting the game apparatus 10 inside out. For example, the user can image a landscape as the user is seen from the game apparatus 10 with the inward camera 16, and can image a landscape as the direction opposite to the user is seen from the game apparatus 10 with the outward camera 18.

Furthermore, the inward camera 16 is attached to the center of the shaft portion 22a formed at the bottom of the upper housing 22. That is, the inward camera 16 is attached at the center of the part where the two housings 20 and 22 are connected. Accordingly, in a case that the game apparatus 10 is in the open state, the inward camera 16 is arranged between the two LCDs 12 and 14 (see FIG. 1). In other words, the inward camera 16 is positioned in the vicinity of the center of the game apparatus 10. Here, "the center of the game apparatus 10" means the center of the operation surface of the game apparatus 10 (surface being made up of the inner surfaces of the respective housings 20 and 22 in the open state). Here, it may be said that the inward camera 16 is arranged in the vicinity of the center in the horizontal direction of the LCDs 12 and 14. In this embodiment, when the game apparatus 10 is set to the open state, the inward camera 16 is arranged in the vicinity of the center of the game apparatus 10, and therefore, in a case that the user images the user himself or herself by the inward camera 16, the user may hold the game apparatus 10 at a position directly opposite to the game apparatus 10. That is, if the user holds the game apparatus at a normal holding position, the user is positioned at approximately the center of an imaging range, and the user himself or herself can easily be within the imaging range.

Furthermore, as shown in FIG. 3(B), the outward camera 18 is arranged at the upper end of the upper housing 22 (portion far away from the lower housing 20) in a case that the game apparatus 10 is set to the open state. Here, since the outward camera 18 is not for imaging the user holding the game apparatus 10, there is less need for being provided at the center of the game apparatus 10.

Furthermore, as shown in FIG. 1 or FIG. 3(B), a microphone 32 is housed in the upper housing 22. More specifically, the microphone 32 is attached to the shaft portion 22a of the upper housing 22. In this embodiment, the microphone 32 is attached around the inward camera 16 (next to the inward camera 16 along the y axis), and specifically attached next to the inward camera 16 in the positive direction of the y axis. Furthermore, a through hole for microphone 22c is mounted to the shaft portion 22a at a position corresponding to the microphone 32 (next to the inward camera 16) such that the microphone 32 can detect a sound outside the game apparatus 10. Alternatively, the microphone 32 may be housed in the lower housing 20. For example, the through hole for microphone 22c is provided on the inner surface of the lower housing 20, specifically, at the lower left (button arranging area A1) of the inner surface of the lower housing 20, and the microphone 32 may be arranged in the vicinity of the through hole for microphone 22c within the lower housing 20. In addition, the microphone 32 is attached in such a direction that its sound collecting direction (direction in which the sensitivity becomes maximum) is approximately in parallel with the imaging direction (optical axis) of the inward camera 16 (in other words, the sound collecting direction and the imaging direction are approximately in parallel with the z axis). Thus, a sound generated within the imaging range of the inward camera 16 is suitably acquired by the microphone 32. That is, detection of a sound input through the microphone 32 and detection of the user by the imaged image by the inward camera 16 can be simultaneously performed, and accuracy of the detections can be improved, at the same time.

As shown in FIG. 3(B), on the outer surface of the upper housing 22, a fourth LED 26d is attached. The fourth LED 26d is attached around the outward camera 18 (at the right side of the outward camera 18 in this embodiment). The fourth LED 26d lights up at a time when an imaging is made with the inward camera 16 or the outward camera 18 (shutter button is pushed). Furthermore, the fourth LED 38 continues to light up while a motion image is imaged by the inward camera 16 or the outward camera 18. By making the fourth LED 26d light up, it is possible to inform an object to be imaged that an imaging with the game apparatus 10 is made (is being made).

Furthermore, the inner surface of the lower housing 22 is formed to be approximately planar. As shown in FIG. 1, at the center of the inner surface, an opening 22b for exposing the upper LCD 14 is formed. The screen of the upper LCD 14 housed inside the upper housing 22 is exposed from the opening 22b. Furthermore, on both side of the aforementioned opening 22b, a sound release hole 22d is formed one by one. Inside the sound release hole 22d of the upper housing 22, a speaker 34 is hosed. The sound release hole 22d is a through hole for releasing a sound from the speaker 34.

Thus, on the inner surface of the upper housing 22, non-display areas (areas B1 and B2 represented by a dotted lines in FIG. 1. More specifically, areas for arranging the speaker 34; speaker arranging areas) are provided on both sides of the opening 21B set at the center of the upper LCD 14. The two sound release holes 22d are arranged at approximately the center of the horizontal direction of each speaker arranging area with respect to the horizontal direction, and at the lower portion of each speaker arranging area with respect to the vertical direction (area close to the lower housing 20).

Here, as described above, by providing the non-display areas on the lower housing 20 and the upper housing 22 at the same positions in the horizontal direction, the game apparatus 10 is configured to help user's holding not only when it is held horizontally as shown in FIG. 4, but also when it is held vertically (a state rotated to left or right by 90° from the state shown in FIG. 4).

As described above, the upper housing 22 is provided with the cameras 16 and 18 which are configured to image an image and the upper LCD 14 as a display means for displaying the imaged image. On the other hand, the lower housing 20 is provided with the input device (touch panel 28 and respective buttons 24a to 24i) for performing an operation input to the game apparatus 10. Accordingly, when utilizing the game apparatus 10 as an imaging device, the user can perform an input to the input device with the lower housing 20 holding while viewing the imaged image (image imaged by the camera) displayed on the upper LCD 14.

Furthermore, in the vicinity of the camera 16 of the upper housing 22, the microphone 32 configured to input a sound is provided, and the game apparatus 10 can also be used as a recording device. In addition, the user performs a sound input over the microphone 32, and the game apparatus 10 can execute the game processing and application processing other than the game on the basis of the microphone input information as well.

Figure 5:
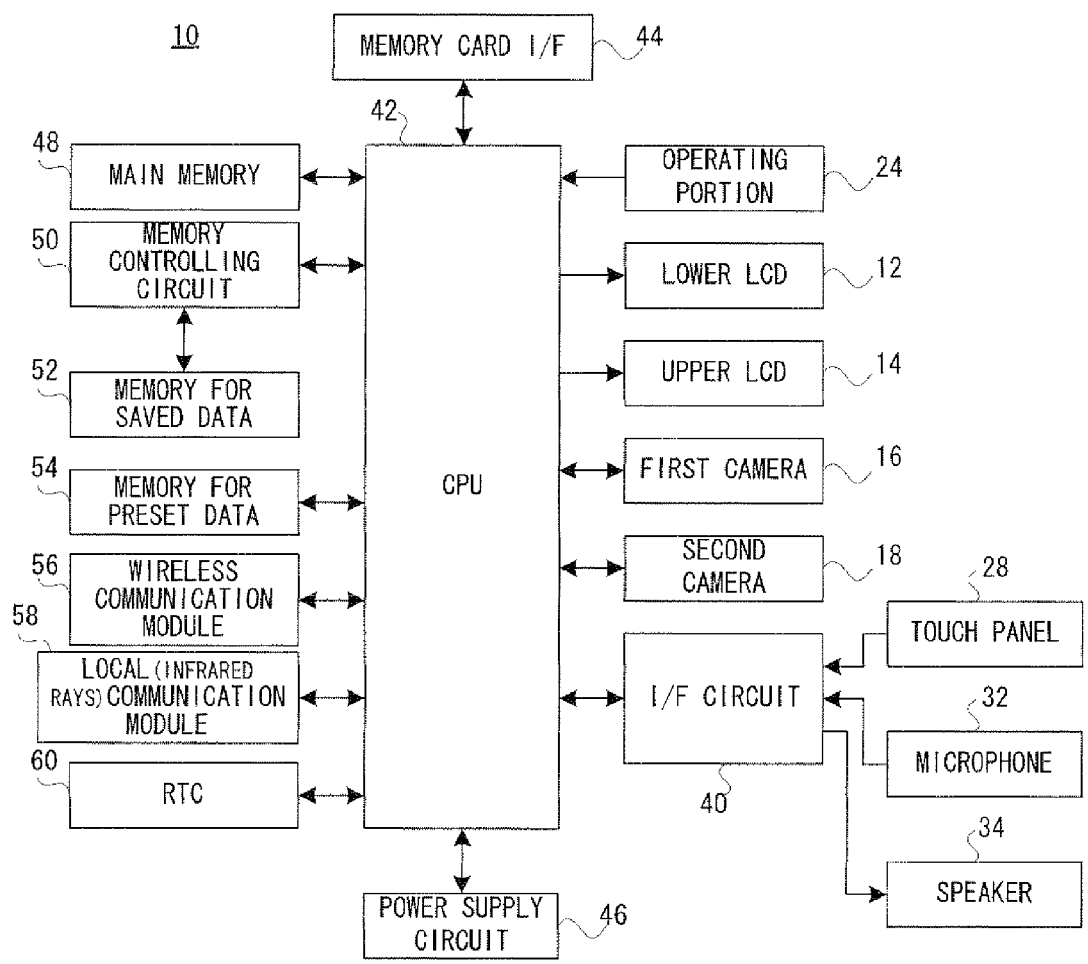
FIG. 5 is a block diagram showing one example of an electric configuration of the game apparatus.

FIG. 5 is a block diagram showing an internal configuration (electronic configuration) of the game apparatus 10. As shown in FIG. 5, the game apparatus 10 includes electronic components, such as a CPU 42, a main memory 48, a memory controlling circuit 50, a memory for saved data 52, a memory for preset data 54, a memory card interface (memory card I/F) 44, a wireless communication module 56, a local communication module 58, a real-time clock (RTC) 60, a power supply circuit 46, and an interface circuit (I/F circuit) 40, etc. Theses electronic components are mounted on an electronic circuit board, and housed in the lower housing 20 (or the upper housing 22 may also be appropriate).

The CPU 42 is an information processing means to execute various programs. In a case that the game apparatus 10 is utilized as an imaging device, the program for it is stored in the memory (memory for saved data 52, for example) within the game apparatus 10. The CPU 42 executes the program to allow the game apparatus 10 to function as an imaging device. Here, the programs to be executed by the CPU 42 may previously be stored in the memory within the game apparatus 10, may be acquired from the memory card 38b, and may be acquired from another appliance, etc. by communicating with this another appliance, etc.

The CPU 42 is connected with the main memory 48, the memory controlling circuit 50, and the memory for preset data 54. Furthermore, the memory controlling circuit 50 is connected with the memory for saved data 52. The main memory 48 is a memory means to be utilized as a work area and a buffer area of the CPU 42. That is, the main memory 48 stores various data to be utilized in the game processing and the application processing, and stores a program obtained from the outside (memory cards 38b, another appliance, etc.). In this embodiment, a PSRAM (Pseudo-SRAM) is used, for example, as a main memory 48. The memory for saved data 52 is a memory means for storing (saving) a program to be executed by the CPU 42, data of an image imaged by the respective cameras 16 and 18, etc. The memory for saved data 52 is configured by a NAND type flash memory, for example. The memory controlling circuit 50 is a circuit for controlling reading and writing from and to the memory for saved data 52 according to an instruction from the CPU 42. The memory for preset data 54 is a memory means for storing data (preset data), such as various parameters, etc. which are previously set in the game apparatus 10. As a memory for preset data 54, a flash memory to be connected to the CPU 42 through an SPI (Serial Peripheral Interface) bus can be used.

The memory card I/F 44 is connected to the CPU 42. The memory card I/F 44 performs reading and writing data from and to the memory cards 38a and 38b attached to the connector according to an instruction from the CPU 42. In this embodiment, the image data imaged by the respective cameras 16 and 18 is written to the memory card 38a, and the image data stored in the memory card 38a is read from the memory card 38a and stored in the memory for saved data 52. Furthermore, the program and the data stored in the memory card 38 are read to transfer it to the main memory 48.

The wireless communication module 56 has a function of making a wireless LAN communication compliant with IEEE802.11b/g standards, for example. Furthermore, the local communication module 58 has a function of performing a wireless communication with the same types of the game apparatuses by a predetermined communication system, such as an infrared communication. The wireless communication module 56 and local communication module 58 are connected to the CPU 42. The CPU 42 can send and receive data over the Internet 202 with other appliances by means of the wireless communication module 56, and can send and receive data with the same types of other game apparatuses by means of the local communication module 58.

It should be noted that the local communication module 58 is contained in the game apparatus 10 in this embodiment, but may be provided to the memory card 38b. In this case, the CPU 42 performs a control of the communication via the memory card I/F 44.

Additionally, the CPU 42 is connected with the RTC 60 and the power supply circuit 46. The RTC 60 counts a time to output the same to the CPU 42. The CPU 42 can calculate a current time (date) on the basis of the time counted by the RTC 60, and detects an operation timing as to when an image is to be acquired, etc. The power supply circuit 46 controls power supplied from the power supply (a battery accommodated in the lower housing) included in the game apparatus 10, and supplies the power to the respective circuit components within the game apparatus 10.

Moreover, the game apparatus 10 is provided with the microphone 32 and the speaker 34. The microphone 32 and the speaker 34 are connected to the I/F circuit 40. The microphone 32 detects a sound of the user and outputs a sound signal to the I/F circuit 40. The speaker 34 outputs a sound corresponding to the sound signal from the I/F circuit 40. The I/F circuit 40 is connected to the CPU 42. Furthermore, the touch panel 28 is connected to the I/F circuit 40. The I/F circuit 40 includes a sound controlling circuit for controlling the microphone 32 and the speaker 34, and a touch panel controlling circuit for controlling the touch panel 28. The sound controlling circuit performs an A/D conversion and a D/A conversion on a sound signal, or converts a sound signal into audio data in a predetermined format. The converted audio data is written to a sound area (not shown) of the main memory 48. If the game apparatus 10 is utilized as a recording device, the audio data stored in the sound area is written to the memory for saved data 52 via the memory controlling circuit 50 thereafter (recorded in the memory card 38a via the memory card I/F 44 as required). Furthermore, the audio data (microphone input information) stored in the sound area 80 is also utilized for various game processing. The touch panel controlling circuit performs reading of a signal from the touch panel 28 and generating touch position data every predetermined time period. The touch position data indicates coordinates of a position where an input is performed on an input surface of the touch panel 28. Also, the touch panel controlling circuit performs reading of a signal from the touch panel 28 and generation of the touch position data per each predetermined time. The CPU 42 acquires the touch position data to thereby know the position where the input is made on the touch panel 28.

The operating portion 24 is made up of the aforementioned respective buttons 24a to 24i, and connected to the CPU 42. The operation data indicating an input state (whether or not to be pushed) with respect to each of the operation buttons 24a to 24k is output from the operation button 24 to the CPU 42. The CPU 42 executes processing according to an input to the operating portion 24 by acquiring the operation data from the operating portion 24.

The respective cameras 16 and 18 are connected to the CPU 42. The respective cameras 16 and 18 image images according to an instruction from the CPU 42, and output imaged image data to the CPU 42. The CPU 42 writes the image data from each of the cameras 16 and 18 to an image area (not shown) of the main memory 48. In a case that the game apparatus 10 is utilized as an imaging device, the image data stored in the image area is written to the memory for saved data 52 via the memory controlling circuit 50 (and moreover recorded in the memory card 38a via the memory card I/F 44 as required). Furthermore, the image data sorted in the image area can also be utilized for various game processing.

In addition, each of the LCDs 12 and 14 is connected to the CPU 42. Each of the LCDs 12 and 14 displays an image according to an instruction by the CPU 42. In a case that the game apparatus 10 is utilized as an imaging device, the CPU 42 displays an image acquired from any one of the cameras 16 and 18 on the upper LCD 14, and displays an operation screen generated according to predetermined processing on the lower LCD 12. If a game is played with the game apparatus 10, a game image is displayed on one or both of the LCD 12 and 14.

When a puzzle game of this embodiment is executed by the game apparatus 10 configured as described above, each of screens Sn shown in FIG. 9(A) to FIG. 11(B), for example, is displayed on the lower LCD 12. The screens Sn shown in FIG. 9(A) is a screen immediately after starting the game, that is, an initial screen, and the initial screen changes as shown in FIG. 9(B) to FIG. 11(B) in accordance with the progress of the puzzle game. The puzzle game is ended after the screens Sn in FIG. 11(B) is displayed.

What FIG. 9(A) to FIG. 11(B) are in common is that a field Fd is arranged, and at a predetermine position within the field Fd, for example, near an upper end, a goal area G1 taking a shape of a slim tube is arranged. It should be noted that at a predetermined position of the goal area G1, for example, at a lower left, an entrance (Ent: see FIG. 10(C)) is formed when a goal condition (see FIG. 8(A)) is satisfied. At a rightmost end of the goal area G1, an object array (array of "tenkun") Ar representing a goal condition is drawn. Within the field Fd (area except for the goal area G1), objects such as a tenkun 100 and a moppun 102 are arranged.

Objects to be connected in the puzzle game is a tenkun 100, and the tenkun 100 has seven colors, such as red, yellow, blue, orange, green, violet and gray as shown in FIG. 6(A). Out of these, the red, the yellow and the blue are basic three colors, and the orange, the green and the violet are a mixed color obtained by mixing the arbitrary two colors of the basic three colors. Furthermore, as shown in FIG. 14(A), from the tenkun 100, two putitenkuns 104 are generated. The putitenkun 104 has red, yellow, blue, that is, basic three colors as shown in FIG. 6(B).

More specifically, when a predetermined condition is satisfied, one tenkun 100 is separated into two putitenkuns 104. In the separation, the color of the tenkun 100 is inherited by the respective putitenkuns 104. Furthermore, when a predetermined condition is satisfied, arbitrary two putitenkuns 104 are combined into one tenkun 100. In the combination, the color of the two putitenkuns 104 are mixed. When red and blue putitenkuns 104, for example, are combined, a violet tenkun 100 can be obtained. Similarly, when blue and yellow putitenkuns 104 are combined, a green tenkun 100 can be obtained, and when yellow and red putitenkuns 104 are combined, an orange tenkun 100 can be obtained.

On the basis of the aforementioned assumption, a basic flow of the puzzle game is firstly explained. Firstly, when the puzzle game is activated, the initial screen Sn as shown in FIG. 9(A), for example, is displayed on the lower LCD 14. On the initial screen Sn, red, blue and yellow tenkuns 100 are arranged by a predetermined number (one for each, here) at arbitrary positions within the field Fd. Each tenkun 100 moves in an arbitrary direction at a predetermined velocity (V1), and when a certain tenkun 100 is in contact with a periphery (wall) of the field Fd or another tenkun 100 on the screen Sn, it turns to a reverse direction. Furthermore, as an array of tenkun Ar corresponding to the goal condition, "(leading end) blue⇒ red" indicating an order of "blue and red" from the leading end in this order is drawn.

Next, when the player touches the screen Sn with the touch pen 36 or the like to start a sliding operation, a line Ln is drawn according to a touch locus on the screen Sn as shown in FIG. 9(B). Here, a black circle is drawn at a leading end of the line Ln, that is, at a touched position, and an arrow is drawn at the trailing end of the line Ln, that is, a currently touching position. When the player stops touching, the drawing of the line Ln is stopped and the drawn line Ln is erased. Furthermore, the player basically performs a sliding operation so as not to intersect the line Ln with each other, but may intentionally intersect it (see FIG. 13, FIG. 14: described later). In addition, the direction of the tenkun 100 is also reversed even when it is in contact with the line Ln. Thus, by writing a proper line Ln, it is possible to limit the movement of the tenkun 100.

When a predetermined time elapses from the start of drawing of the line Ln, a moppun 102 appears at the leading end of the line Ln, that is, the touched position (black circle) as shown in FIG. 9(C). The moppun 102 moves on the line Ln at a constant velocity to the trailing end, that is, the currently touching position (arrow) direction as shown in FIG. 10(A) while erasing the line Ln. That is, the line Ln is drawn according to a sliding operation while the drawn line Ln is erased by a locus along which the moppun 102 moves. The moppun 102 disappears together with the line Ln after drawing of the line Ln is stopped.

Next, the player continues a sliding operation to move the pen tip to a position of a desired tenkun 100, for example, a blue tenkun 100. When the pen tip, that is, the currently touching position reaches the position of the blue tenkun 100, the blue tenkun 100 is captured by the line Ln as shown in FIG. 10(B). The tenkun 100 thus captured by the line Ln is registered in a "list-of-tenkun-on-a line" (84: see FIG. 8(B)). Thus, the list-of-tenkun-on-a line 84 is updated from "absence" to "blue" (see FIG. 8(B)).

Here, every time that a new tenkun 100 is registered, the list-of-tenkun-on-a line 84 is compared with the goal condition shown in the goal area G1. At this time, the array of the list-of-tenkun-on-a line 84 does not match with the array of tenkun Ar corresponding to the goal condition, and therefore, the entrance Ent is not formed at the goal area G1, and a further tenkun 100 is required to be connected.

When a successive sliding operation is performed to make the touched position reach a position of a red tenkun 100, the red tenkun 100 is now captured by the line Ln as shown in FIG. 10(C). Thus, an array of the blue and red tenkuns 100 from the leading end is formed on the line Ln, and the list-of-tenkun-on-a line 84 is updated from "red" to "(leading end) blue⇒ red" (see FIG. 8(B)).

At this point, since the array of the list-of-tenkun-on-a line 84 matches with the goal condition array Ar, the entrance Ent of the goal area G1 is opened. The player continues to perform a sliding operation to move the pen tip toward the entrance Ent as shown in FIG. 11(A). Then, when the pen tip, that is, the currently touching position reaches the entrance Ent as shown in FIG. 11(B), it is determined that the clear condition is satisfied to thereby execute the clearing processing.

Although illustration is omitted, in the clearing processing, the tenkuns 100 on the line Ln enter the goal area G1 through the entrance Ent in order from the trailing end (that is, red, blue in this order). From the above description, this stage is cleared, and a next stage is started.

Here, before the array of list-of-tenkun-on-a line 84 matches the goal condition array Ar, the moppun 102 (leading end of the line) catches up with the tenkun 100 on the line Ln, the line Ln is erased from the screen Sn togetehr with the moppun 102 as shown in FIG. 12, and the tenkun 100 on the line Ln is released. Thus, the player remakes the array from the first.

Furthermore, as shown in FIG. 13(A), in a case that line Ln is intersected with each other during drawing, the loop Lp made on the line Ln is erased as shown in FIG. 13(B), and then, the tenkuns 100 on the loop Lp are released as shown in FIG. 13(C). Accordingly, if a tenkun 100 is captured in an erroneous order (array), the line is intentionally intersected to release the tenkun 100 on the loop Lp to thereby restart the alignment.

In following stages, more difficult goal conditions are set, and kinds of the tenkun 100 and the moppun 102 are diversified. Within the field Fd, darkness Bk (see FIG. 15) may appear.

In FIG. 7, a way of movement of the object (tenkun 100 and moppun 102) appearing in the puzzle game and the kind of the field Fd are shown. First, the tenkun 100 includes five kinds, such as a "running away" tenkun when the pen tip, that is, the touched position approaches, an "approaching" tenkun to the touched position, and a "jumping" tenkun which goes through the wall and another tenkun in addition to the aforementioned "normal" tenkun and putitenkun (102). Next, the moppun 102 includes a "stopping" moppun at the leading end of the line Ln in addition to the aforementioned "moving" moppun on the line Ln at the predetermined velocity. Then, the field Fd includes a "partly darkness" field making an object invisible at a part of the screen Sn and a "entirely darkness" field making the object invisible on the entire screen Sn in addition to the aforementioned entirely transparent "normal" field.

Some important stages are explained below. In a certain stage, for example, as a array of tenkun Ar corresponding to the goal condition, "(leading end) blue⇒ violet⇒ red" is set. In this case as well, an array of tenkuns such as "(leading end) blue⇒ violet⇒ red" may be formed on the line Ln according to an operation basically similar to the aforementioned operation. However, on the initial screen Sn, only three colors, that is red, blue, yellow tenkuns 100 appear, and a violet tenkun 100 is absent. Hereupon, each of the two colors, red and blue, of tenkuns 100 is separated to putitenkuns 104 (same color), and putitenkuns obtained as to each of the two colors, red and blue, are combined to thereby generate a violet tenkun 100.

More specifically, as shown in FIG. 14(A), when the line Ln is intersected so as to encircle a tenkun 100 of an arbitrary color (red, for example), the tenkun 100 encircled with the line Ln (that is, within the loop Lp) is separated into two putitenkuns 104 of its own color (red, for example). Thus, if separation according to intersection of the line Ln is sequentially performed on the red tenkun 100 and the blue tenkun 100, two putitenkunss 104 are generated for each two colors, red and blue.

On the other hand, as shown in FIG. 14(B), when the line Ln is intersected with each other so as to encircle two putitenkunss 104 of different colors (two colors, red and blue, for example), the two putitenkuns 104 within the loop Lp are combined into one tenkun 100. At this time, the color of the tenkun 100 is a combined color (violet, for example) of the different two colors. Here, if the two putitenkuns 104 have the same color (blue, for example), the color of the tenkun 100 becomes the same color (blue, for example). Accordingly, if a combination according to intersection of the line Ln is performed on the putitenkuns 104 of the two colors, red and blue, a violet tenkun 100 is generated.

Thus, since the elements for making up of the goal condition alignment Ar are entirely prepared, in a procedure the same as FIG. 9(A) to FIG. 11(B), a "(leading end) blue ⇒ violet⇒ red" array is formed on the line Ln, and the array may be guided to the goal area G1.

When the line Ln is intersected, if the number of the putitenkuns existing within the loop Lp is equal to or more than one or three, the tenkun (being equal to or more than 0 or 2: for the sake of convenience, a situation in which no tenkun is included is referred as "0 tenkun being included" here) existing within the loop Lp at this point changes to a gray tenkun. The putitenkun is not changed, and the loop disappears.

One example of a change to gray is shown in FIG. 14(C). In this example, within the loop Lp, one putitenkun and two tenkuns are included, so that the two tenkuns are changed to gray. When a predetermined time elapses from the change of the tenkuns to gray, the tenkuns return to the original colors. By such change in color, a visual change is given to the screen Sn. Furthermore, since the gray tenkun is not included in the goal condition alignment Ar, if the time during which a tenkun is gray is made longer to a certain extent, it is possible to expect an advantage of temporarily increasing difficulty of forming an array.

Figure 15:
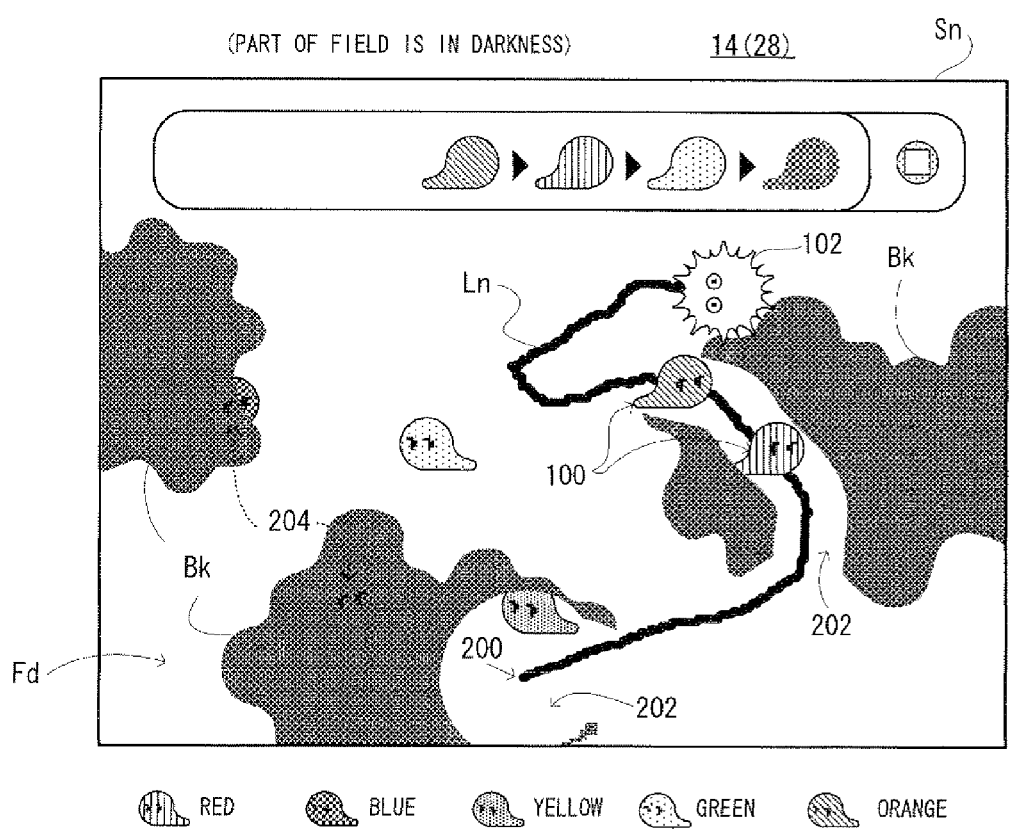
FIG. 15 is an illustrative view showing a game screen in another stage.

Additionally, in a certain stage, a part of the field Fd is in the darkness B as shown in FIG. 15. In addition, although illustration is omitted, in another stage, the entire field Fd is in the darkness Bk. In either case, in the darkness Bk, a tenkun that is not connected to the line Ln becomes invisible other than eyes 204, so the existence can be perceived, but it becomes difficult to identify the color. Specifically, a transparent area 202 which is not hidden under the darkness Bk is ensured around the line Ln, and therefore, the moppun 102 positioned at the leading end 200 of the line Ln and the tenkun 100 connected to the line Ln can be viewed even in the darkness. Furthermore, the transparent area 102 more widens at the trailing end of the line Ln 200, that is, at the currently touching position, and therefore, it is possible to ensure clear sight lines around the currently touching position (pen tip).

In addition, in a certain stage, when the pen tip, that is, the currently touching position approaches, a "running away" tenkun appears. Such tenkun is hard to catch (touch) with the pen tip, so a method of catching the tenkun with its movement interrupted like encircling it with a line Ln, for example, is effective.

Furthermore, in a certain stage, an "approaching" tenkun appears at the pen tip, that is, the currently touching position. When such a tenkun appears, a desired tenkun is hard to catch, and therefore, a method of interrupting the movement of the tenkun with the line Ln is effective.

Additionally, in a certain stage, a "jumping" tenkun which goes through the wall of the field Fd and another tenkun also appears. The method of interrupting the movement of the tenkun with the line Ln cannot be used, and therefore, a high technique is required for capturing.

Figure 13:
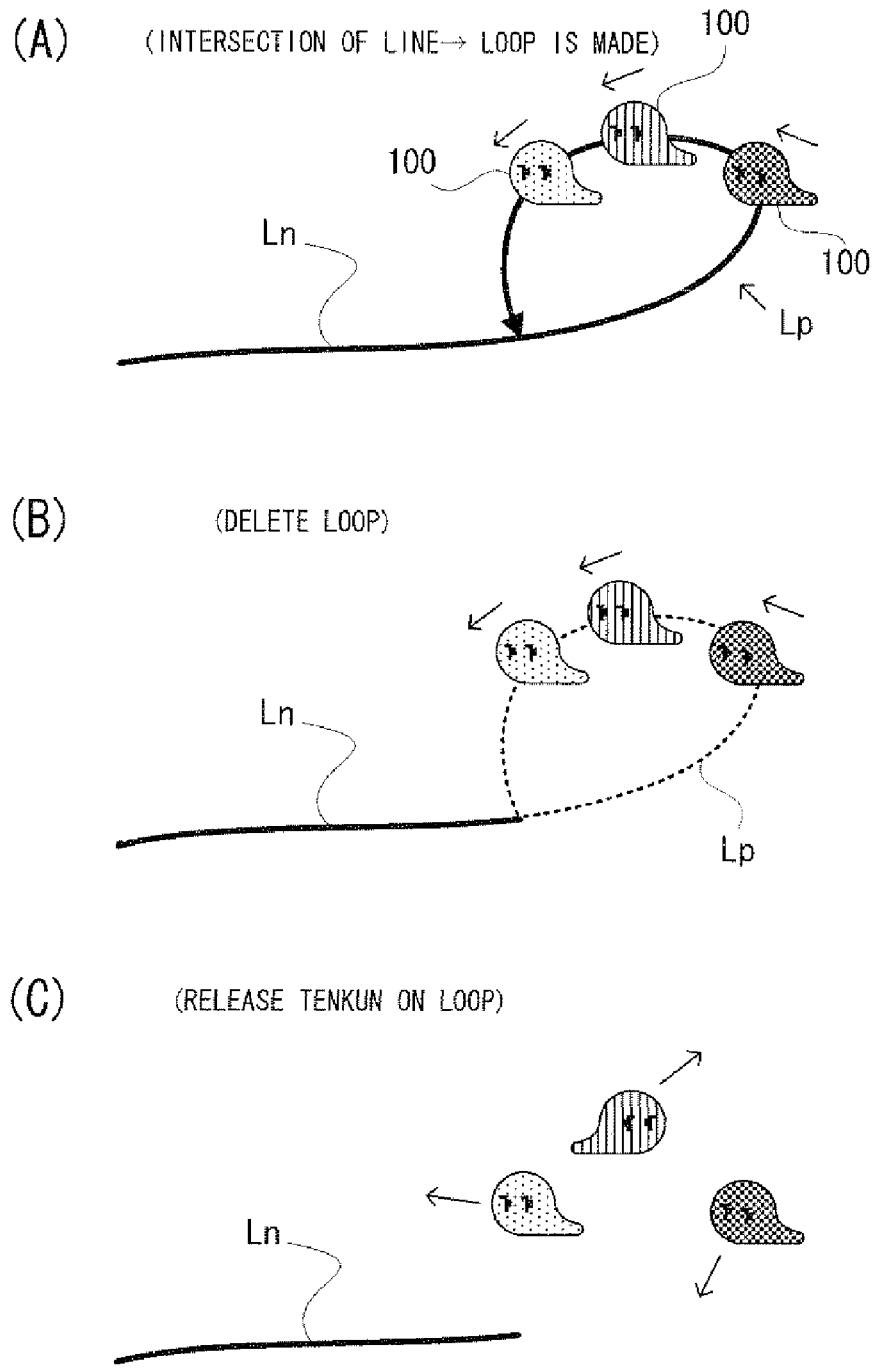
FIG. 13 is an illustrative view showing processing when a line is intersected (loop occurs), in which the line and objects on the line are changed as in (A) to (C)

Furthermore, in a certain stage, a "stopping" moppun at the leading end of the line Ln appears. In this case, the line Ln is not erased by the moppun, and therefore, the line Ln has to be drawn, considering that the line Ln is not intersected with each other. Furthermore, deleting the line by the intersection as shown in FIG. 13 is effective.

In addition, in a certain stage, the length of the line Ln is restricted to be a predetermined length or less (200 dots, for example). In this case, if the velocity of drawing the line Ln is too fast, the length of the line Ln is above the restriction, resulting in game over. Thus, in view of the velocity at which the line Ln is erased, that is, the moving velocity V2 of the moppun, the line Ln has to be drawn so as not to be above the predetermined length.

Figure 16:
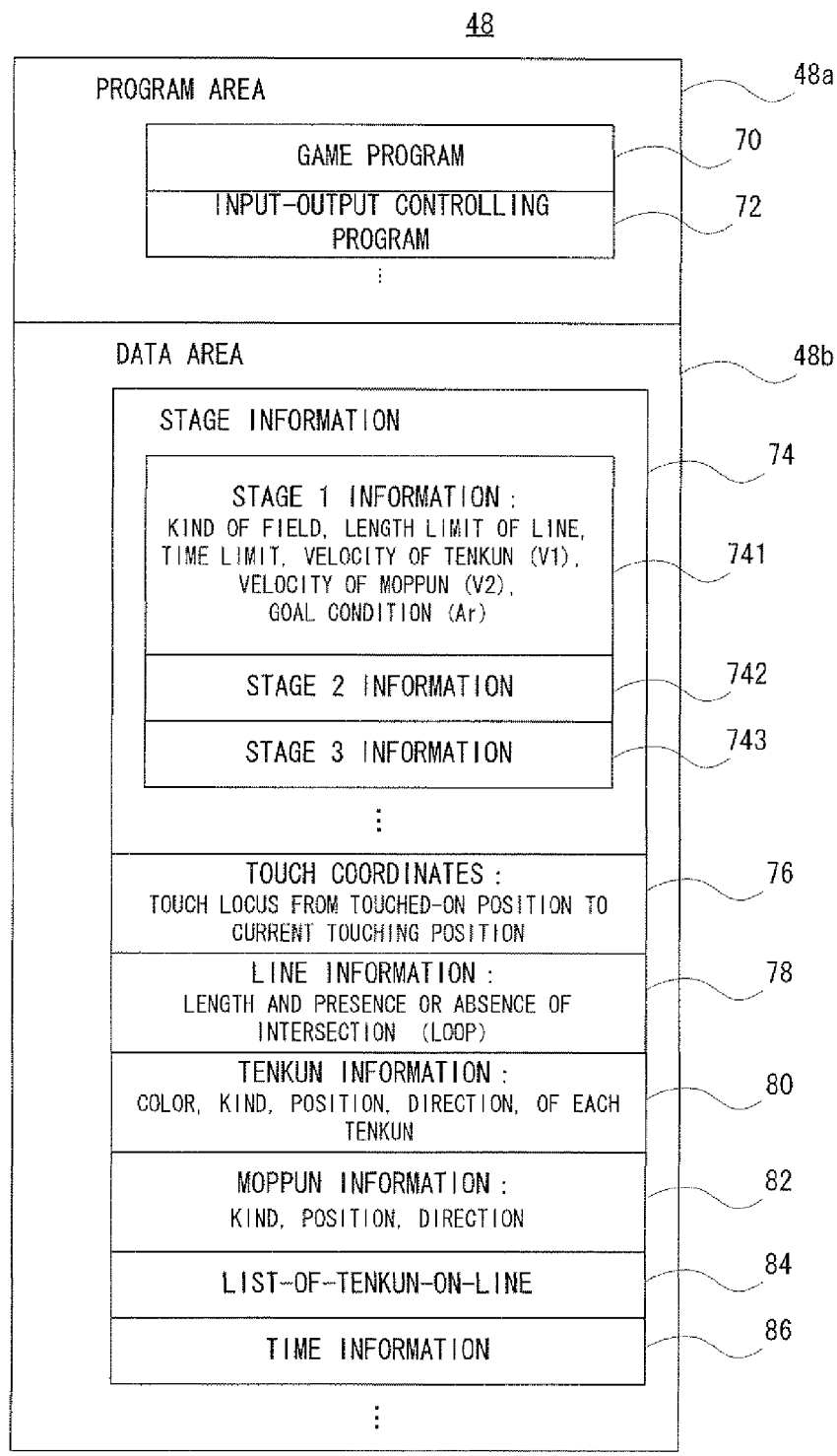
FIG. 16 is an illustrative view showing a part of a memory map of a main memory.

The operation as described above is implemented by execution of a flowchart shown in FIG. 17 to FIG. 24 on the basis of programs and data shown in FIG. 16 that are stored in the main memory 48 by the CPU 42 of the game apparatus 10.

That is, when the puzzle game in this embodiment is executed, a program area 48a and a data area 48b are formed in the main memory 48, and in the program area 48a, a game program 70 and an input-output controlling program 72 are stored as shown in FIG. 15.

The game program 70 is a main software program for implementing the puzzle game by controlling various pieces of hardware (12 to 40, 44 to 60) via the CPU 42, and corresponds to the flowcharts shown in FIG. 17 to FIG. 24. The input-output controlling program 72 is a sub software program to be utilized by the game program 70, and implements a touch input, a button input, an image output, etc. by mainly controlling the LCDs 12 and 14, the operating portion 24, the I/F circuit 40, etc.

In the data area 48b, stage information 74, touch information 76, line information 78, tenkun information 80, moppun information 82, a list-of-tenkun-on-a line 84 and time information 86, etc. are stored. The stage information 74 is information indicating a game condition to be adopted in each stage, and includes stage 1 information 741, stage 2 information 742, stage 3 information 743 . . . .

In the stage 1 information 741, the kind of the field, a length limit of the line, a time limit, a velocity of a tenkun (V1), a velocity of a moppun velocity (V2), and a goal condition (Ar), etc. are described. The kind of the tenkun is any one of the five kinds shown in FIG. 7, he kind of the moppun is any one of the two kinds shown in FIG. 7, and the kind of the field is any one of the three kinds shown in FIG. 7.

As to the length limit of the line, in a case that there is no limit, "absence" is described, and in a case that there is a limit, the limit of the length (constant: 200 dots for example) is described. The time limit is a time from the start of the game to the end of the game, and is described as 1 minute 30 seconds, for example. The velocity (V1) of the tenkun is a velocity at which the tenkun 100 moves within the field Fd or on the line Ln, and is described as 10 dots/second, for example. The velocity of (V2>V1) the moppun is a velocity at which the moppun 102 moves with the line Ln erasing, and is described as 15 dots/second, for example. As to the goal condition, as shown in FIG. 8(A), a predetermined array of tenkun Ar (see FIG. 9(A)) is described.

Here, the same elements are also described in the stage 2 information 742, the stage 3 information 743 . . . .

Although illustration is omitted, a part of the stage information 74, for example, the length limit of the line, the time limit, etc, may be displayed on the upper LCD 14 together with the time information 86 described later.

The touch information 76 is series of coordinate data obtained by sampling the outputs of the touch panel 28 at a predetermined cycle, and shows the latest touch locus (that is, the line Ln drawn on the screen Sn at the present time) from the touched-on (start of touching) position to the currently touching position. In the line information 76, the length of the line Ln, the presence or absence of an intersection (loop Lp), etc. are described. The length of the line Ln and the presence or absence of an intersection are calculated on the basis of the touch information 76 for each frame, and updated to a new value.

In the tenkun information 80, as to each tenkun 100 within the screen Sn, the color, the kind (way of movement), the position and the direction are described. The color is one (constant) out of the seven colors as shown in FIG. 6(A), but may be changed according to a separation or a combination as shown in FIG. 14. The position and direction are calculated based on a predetermined algorithm every one frame, and updated to the latest value.

In the moppun information 82, as to the moppun 102 within the screen Sn, the kind (way of movement), the position and the direction are described. The position and direction are calculated on the basis of the predetermined algorithm every frame, and updated to the latest value.

The list-of-tenkun-on-a line 84 is a list of the array of tenkun aligned on the line Ln at the present time, and one example is shown in FIG. 8(B). The content is updated every time that a new tenkun is added. The time information 86 is information indicating an elapsed time from the start of the game, and updated at a predetermined cycle (every 6 frames, that is, every 0.1 seconds, for example). The various times to be referred during the game, for example, an elapsed time from the start of drawing a line Ln, etc. is also calculated on the basis of the time information 86.

Figure 17:
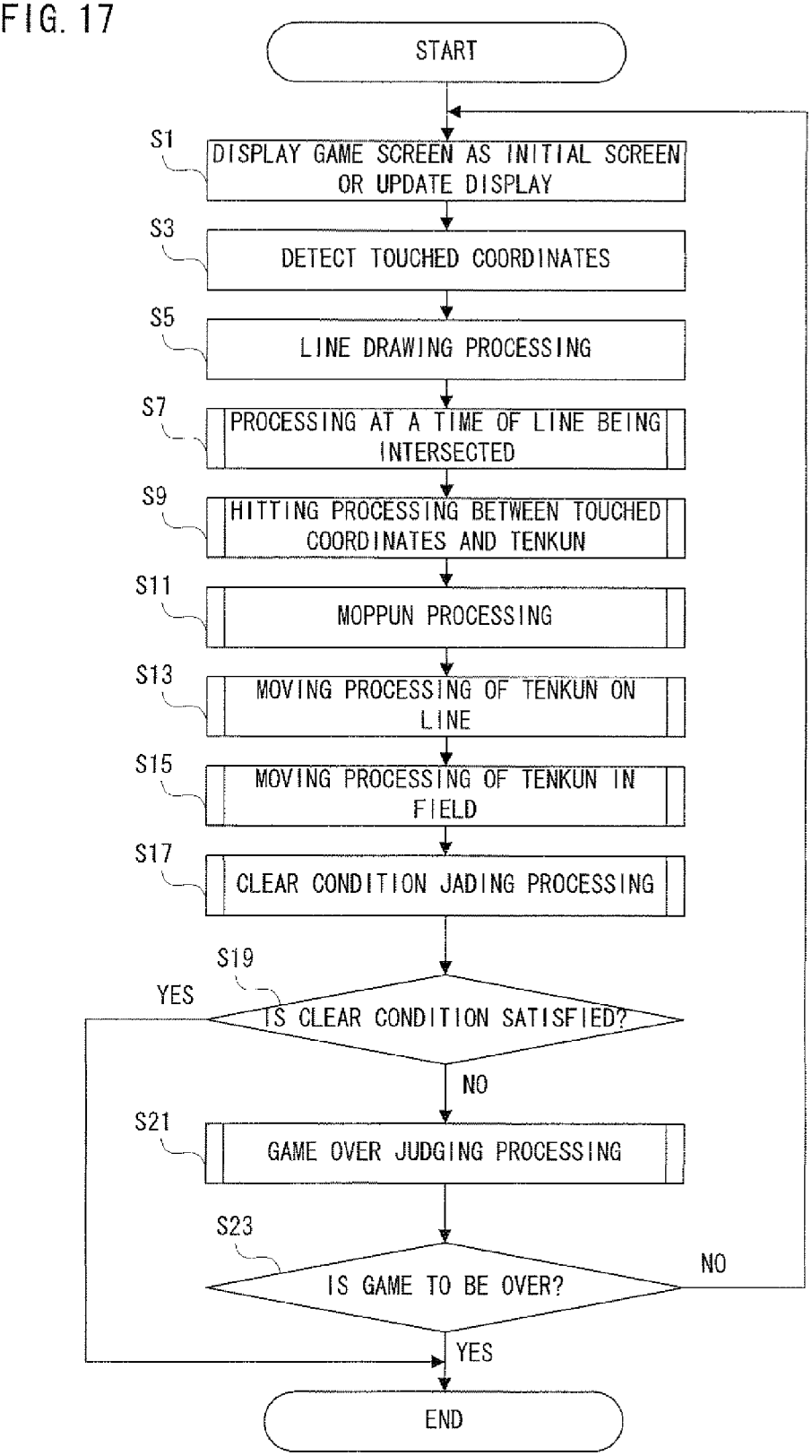
FIG. 17 is a flowchart showing a part of an operation by a CPU.

When the game program 70 is activated, the processing in steps S1 to S23 shown in FIG. 17 is repetitively executed every frame. Referring to FIG. 17, the CPU 42 firstly displays on the LCD 12 the game screen shown in FIG. 9(A), for example, as an initial display on the basis of the stage information 74 and the tenkun information 80 in the step S1. Next, in the step S3, a currently touching position (touch information) is detected, and the touch information 76 and the line information 78 of the data area 48b are updated. In addition, in the step S5, a line Ln is drawn on the screen Sn (the line information 78 of the data area 48b is updated) as shown in FIG. 9(B), and in the step S7, processing at a time of a line being intersected (FIG. 18: described later) is executed. The processing result in the step S7 is reflected on the tenkun information 80, the list-of-tenkun-on-a line 84 of the data area 48b, etc.

Next, in the step S9, contact processing between touched coordinates and tenkun (FIG. 19: described later) is executed, and moreover, moppun processing (FIG. 20: described later), moving processing of a tenkun on a line (FIG. 21: described later), moving processing of a tenkun in a field (FIG. 22: described later) are respectively executed in the step S11, the step S13, and the step S15 in order. The processing result in the steps S9 to S15 are reflected on the line information 78, the tenkun information 80, the moppun information 82, the list-of-tenkun-on-a line 84, etc. of the data area 48b as necessary.

Then, after in the step S17, clear condition judging processing (FIG. 23: described later) is executed, it is determined whether or not the clear condition is satisfied in the step S19. Here, the judgment result in the step S17 is represented by a flag, and the determination in the step S19 is performed with reference to the flag. If "YES" in the step S19, the processing is ended.

If "NO" in the step S19, game over judging processing (FIG. 24: described later) is executed in the step S21, and then, it is determined whether or not the game is over in the next step S23. Here, the determination result in the step S21 is indicated by another flag, and the determination in the step S23 is performed with reference to the flag. If "YES" in the step S23, the processing is to be ended.

If "NO" in the step S23, the process returns to the step S1 to update the display of the game screen. That is, a screen Sn in a next frame is displayed in place of the screen Sn in the current frame on the LCD12. The processing result in the steps S3 to S15 executed before, that is, the updated content of the data area 48b is reflected on the game screen at the present time. In what follows, similar processing is repetitively executed until the clear condition is satisfied, or the game is over.

Figure 18:
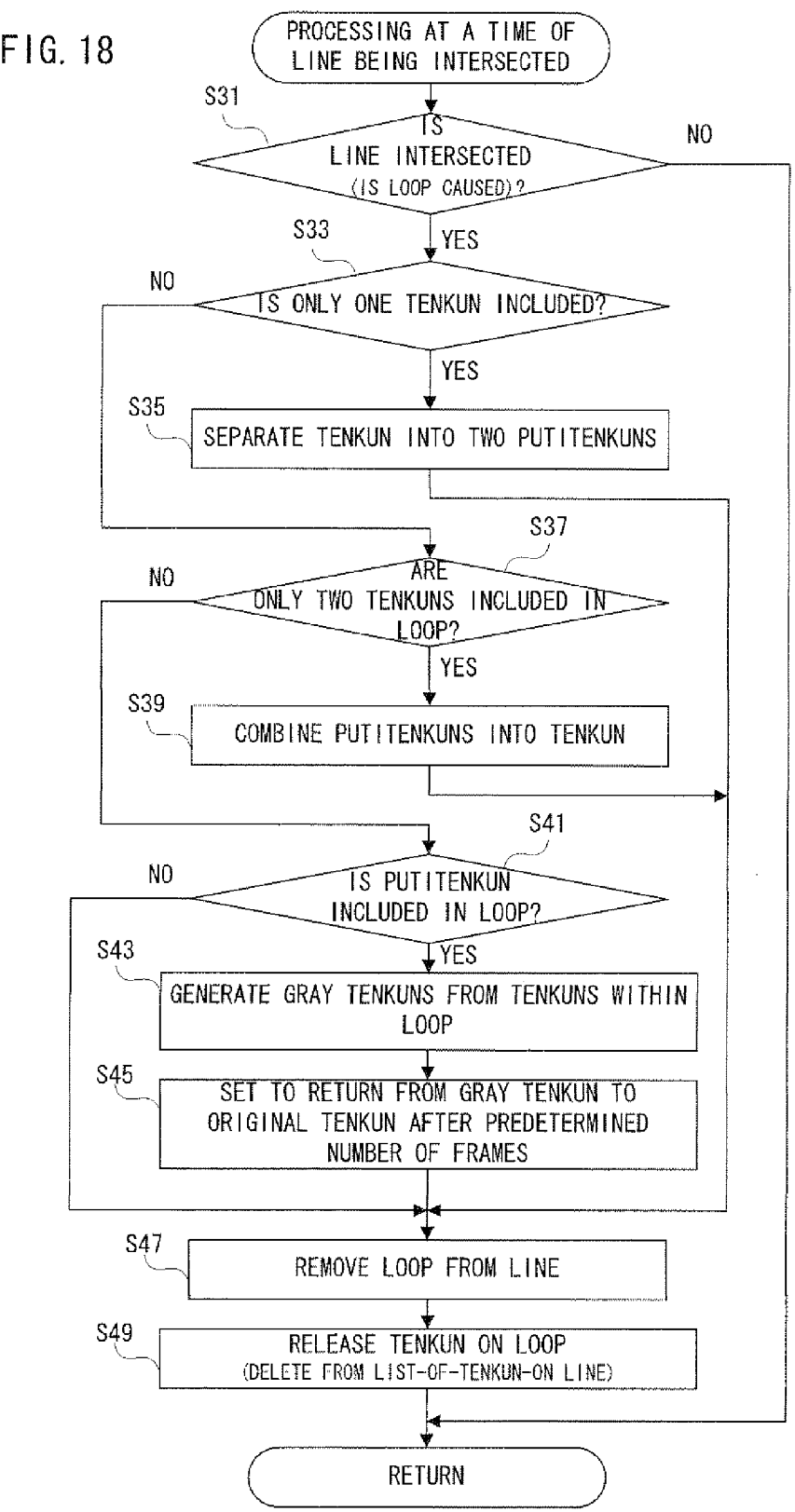
FIG. 18 is a flowchart showing another part of the operation by the CPU.

The processing in the aforementioned step S7, that is, the processing at a time of a line being intersected is executed according to a subroutine shown in FIG. 18 in details. Firstly, in a step S31, it is determined whether or not the line Ln is intersected on the basis of the line information 78, and if "NO" here, the process is restored to the main routine (see FIG. 17). If "YES" in the step S31, it is determined whether or not only one tenkun is included within a loop Lp (area inside the loop Lp) caused by the intersection in a step S33. If "NO" in the step S33, the process proceeds to a step S37 whereas if "YES", the tenkun is separated into two putitenkuns (see FIG. 14(A)) in a step S35. After the separation, the process proceeds to a step S47.

In the step S37, it is determined whether or not only two tenkuns are included within the loop Lp. If "NO" in the step S37, the process proceeds to a step S41 whereas if "YES", these two putitenkuns are combined into one tenkun (see FIG. 14(B)) in a step S39. Then after the combination, the process proceeds to the step S47.

In the step S41, it is determined whether or not a putitenkun is included within the loop Lp. Accordingly, if one or more putiten is included within the loop Lp, the determination result is "YES", and if no putitenkun is included, it is "NO". However the step S41 is processing after "NO" is determined in the steps S33 and S37, so that if "YES", only one putitenkun or three or more putitenkuns are included within the loop Lp, and moreover, zero tenkuns or two or more tenkuns are included. Here, for the sake of convenience, a situation in which no tenkuns or putitenkuns are included is referred as zero tenkuns or putitenkuns being included.

Hereupon, if "YES" in the step S41, the process proceeds to a step S43 to change zero tenkuns or two or more tenkuns within the loop Lp to gray (see FIG. 14(C)). Here, the color of the putitenkun is not changed. Then, the tenkuns which change in color to gray are set to be returned to the original color after a predetermined number of frames (after 60 frames, for example) in a next step S45. Thus, the gray tenkuns return to the original color after one second, for example. After the setting, the process proceeds to the step S47.

On the other hand, if "NO" in the step S41, no putitenkun and no tenkun (zero putitenkuns and zero tenkuns) are included within the loop Lp, or two or more tenkuns are included within the loop Lp, but the process proceeds to the step S47 without any change.

In the step S47, as shown in FIG. 13(B) or FIG. 14(A) to FIG. 14(C), the loop Lp is erased from the line Ln, for example. Then, in a next step S49, as shown in FIG. 13(C), for example, the tenkun on the loop Lp is released (erased from the list-of-tenkun-on-a line 84). Here, the tenkun arranged at a position different from the loop Lp on the line Ln is not released at the present time. The released tenkun moves in an arbitrary direction thereafter. After the release, the process is restored to the main routine.

Figure 19:
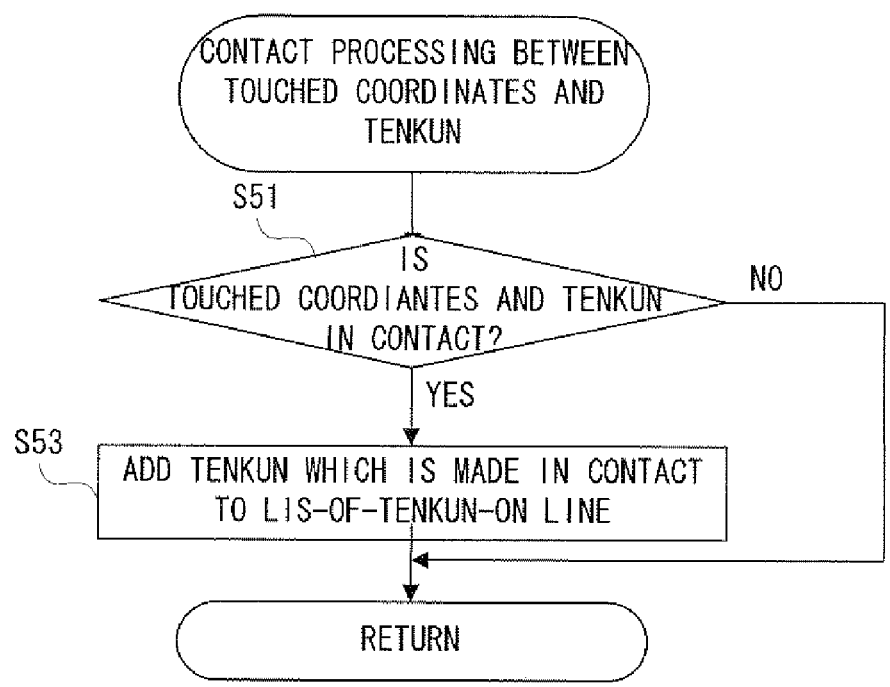
FIG. 19 is a flowchart showing a still another part of the operation by the CPU.

The processing in the aforementioned step S9, that is, the contact processing between the touched coordinates and the tenkun is executed according to a subroutine in FIG. 19 in details. Firstly, in a step S51, it is determined whether or not the pen tip, that is, the currently touching position is in contact with the tenkun based on the touch information 76 and the tenkun information 80. If "NO" here, the process is restored to the main routine without any change. If "YES" in the step S51, the tenkun which is made in contact is added to the list-of-tenkun-on-a line 84 (see FIG. 8(B)) in a step S53. After the addition, the process is restored to the main routine.

Figure 20:
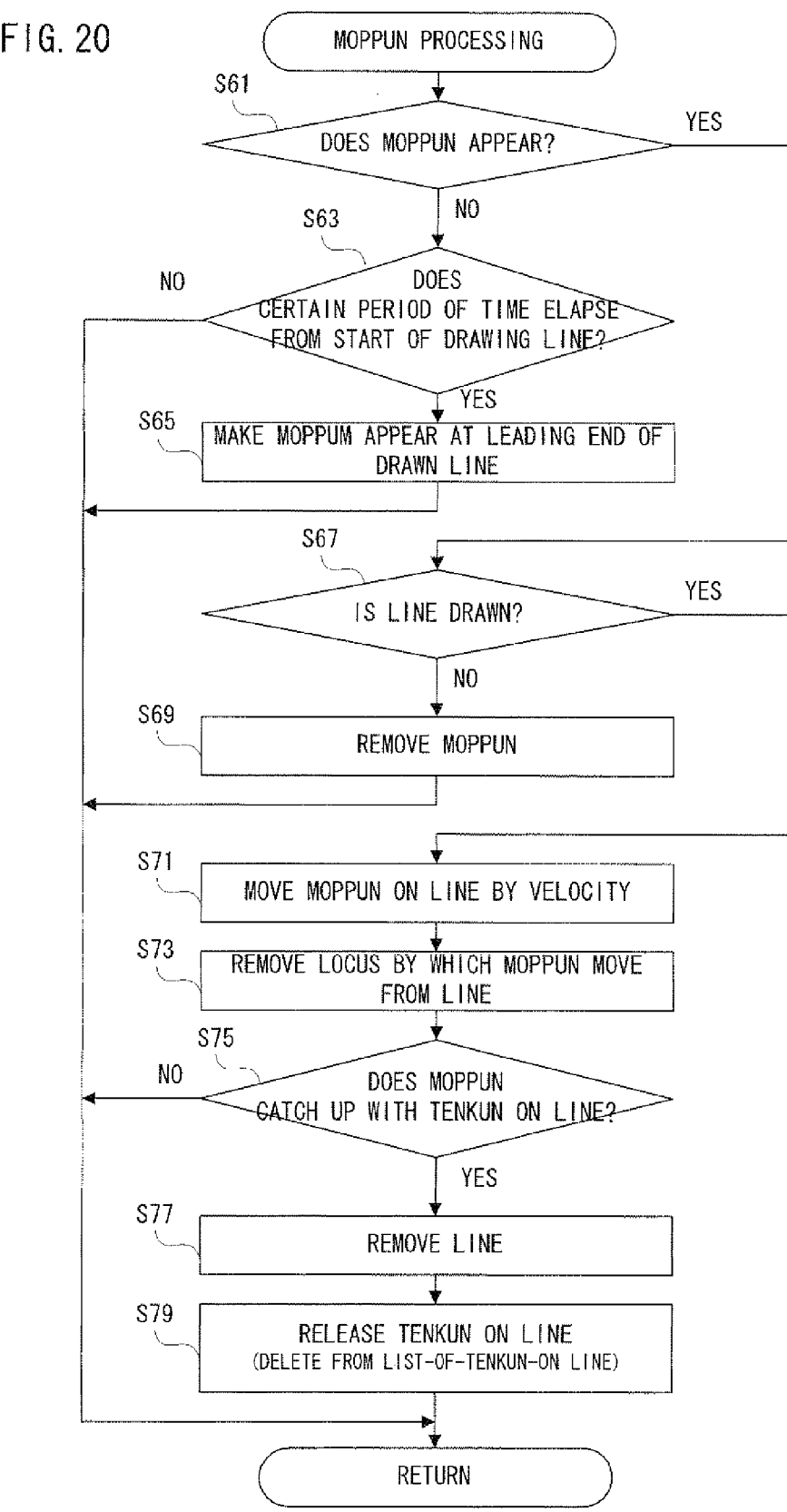
FIG. 20 is a flowchart showing a further part of the operation by the CPU.

The processing in the aforementioned step S11, that is, the moppun processing is executed according to a subroutine in FIG. 20 in details. Firstly, in a step S61, it is determined whether or not a moppun appears on the basis of the moppun information 82, and if "YES", the process proceeds to a step S67. If "NO" in the step S61, the process proceeds to a step S63 to further determine whether or not a certain period of time or more elapses from the start of the drawing of the line Ln on the basis of the time information 86. If "NO" here, the process is restored to the main routine.

If "YES" in the step S63, the moppun 102 is caused to appear (the moppun information 82 is updated) at the leading end of the drawn line Ln as shown in FIG. 9(C), for example, in a step S65. Thereafter, the process is restored to the main routine.

In the step S67, it is determined whether or not a line Ln is drawn on the basis of the line information 78. If "NO" here, after the moppun 102 is removed (the moppun information 82 is updated) from the screen Sn in a step S69, the process is restored to the main routine.

If "YES" in the step S67, the process proceeds to a step S71 to move the moppun 102 on the line Ln by the velocity (V2) (the moppun information 82 is updated). The velocity V2 of the moppun 102 is described in the stage information 74. Next, in a step S73, as shown in FIG. 10(C), for example, the locus by which the moppun 102 moves is removed from the line Ln (the line information 78 is updated). Then, in a step S75, it is determined whether or not the moppun 102 catches up with the tenkun 100 on the line Ln on the basis of the line information 78, the tenkun information 80, the moppun information 82, etc. as shown in FIG. 12, for example. If "NO" here, the process is restored to the main routine.

If "YES" in the step S75, the line Ln is removed from the screen Sn as shown in FIG. 12 in a step S77, and then, the tenkun 100 on the line Ln is released (erased from the list-of-tenkun-on-a line 84) in a step S79. The released tenkun 199 moves to an arbitrary direction thereafter. Then, the process is restored to the main routine.

Figure 21:
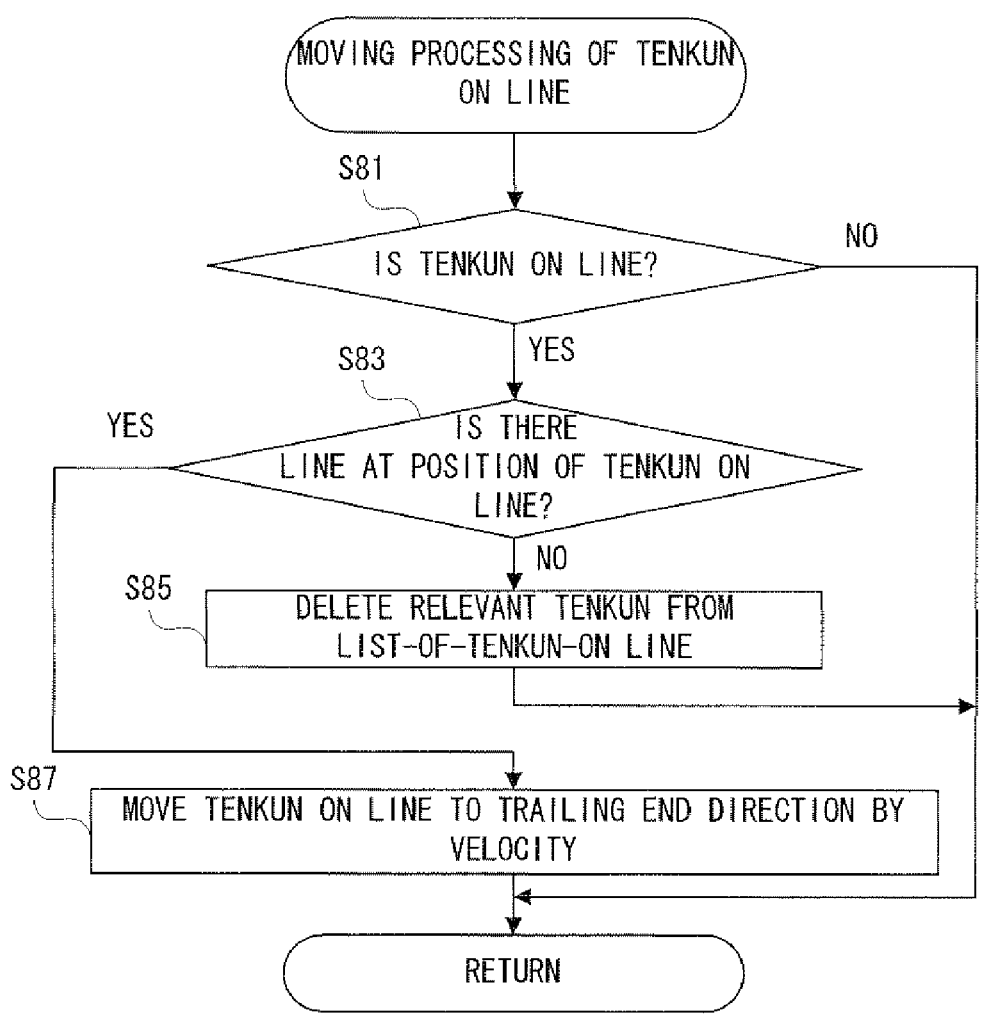
FIG. 21 is a flowchart showing another part of the operation by the CPU.

The processing in the aforementioned step S13, that is, the moving processing of a tenkun on a line is executed according to a subroutine in FIG. 21 in details. Firstly, in a step S81, it is determined whether or not the tenkun 100 is on the line Ln on the basis of the list-of-tenkun-on-a line 84, and if "NO", the process is restored to the main routine. If "YES" in the step S81, it is determined whether or not there is a line Ln at the position of the tenkun on the line (the current position of the tenkun 100 registered in the list-of-tenkun-on-a line 84) on the basis of the line information 78, the tenkun information 80, etc. in a step S83, and if "YES" here as well, the process proceeds to a step S87. Here, a fact that there is no line Ln at the position of the tenkun on the line is equivalent to a case that the line Ln is intersected with each other to thereby remove a part of it (loop Lp) (S49), or a case that the moppun 102 catches up with the tenkun 100 on the line Ln to thereby remove the line Ln (S79).

If "NO" in the step S83, a relevant tenkun is erased from the list-of-tenkun-on-a line 84 in a step S85, and the process is restored to the main routine. If "YES" in the step S83, the tenkun on the line Ln is moved to the trailing end direction of the line Ln by the velocity (V1) (tenkun information 80 is updated) as shown in FIG. 10(B), FIG. 10(C), etc. for example. The velocity V1 of the tenkun is described in the stage information 74. Thereafter, the process is restored to the main routine.

Figure 22:
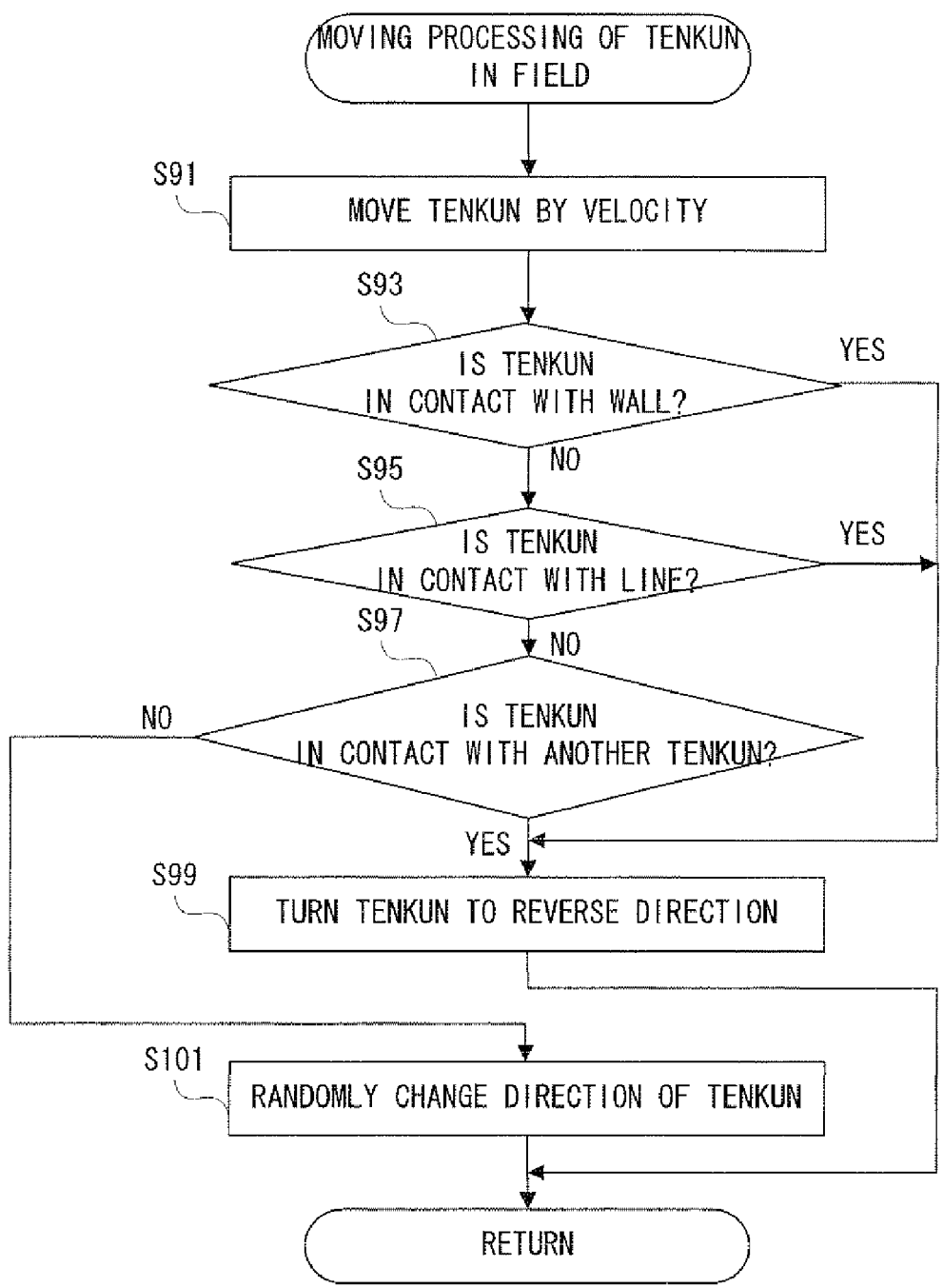
FIG. 22 is a flowchart showing a still another part of the operation by the CPU.

The processing in the aforementioned step S15, that is, the moving processing of a tenkun in a field is executed according to a subroutine shown in FIG. 22 in details. Firstly, in a step S91, the tenkun 100 (except for the tenkun 100 on the line Ln) on the field is moved by the velocity (V1) in the way of movement of the tenkun described in the stage information 74 (tenkun information 80 is updated). Here, the tenkun within the field Fd and the tenkun on the line Ln are moved at the same velocity V1, but the velocity may be differentiated between within the field Fd and on the line Ln, or may be set for each tenkun.

Next, in a step S93, it is determined whether or not the tenkun is in contact with a wall, that is, the periphery of the screen Sn on the basis of the tenkun information 80, and if "YES" here, the process proceeds to a step S99. If "NO" in the step S93, it is further determined whether or not the tenkun is in contact with the line Ln on the basis of the touch information 76 and the line information 78 in a step S95. If the determination result in the step S95 is "YES", the process proceeds to the step S99 whereas if "NO", it is determined whether or not the tenkun is in contact with another tenkun in a step S97. If "NO" in the step S97 as well, the process proceeds to a step S101 to randomly change the direction of the tenkun (the tenkun information 80 is updated) and the process is restored to the main routine. If "YES" in the step S97, the process proceeds to the step S99.

In the step S99, the tenkun is turned to a reverse direction (tenkun information 80 is updated). Then, the process is restored to the main routine.

Figure 23:
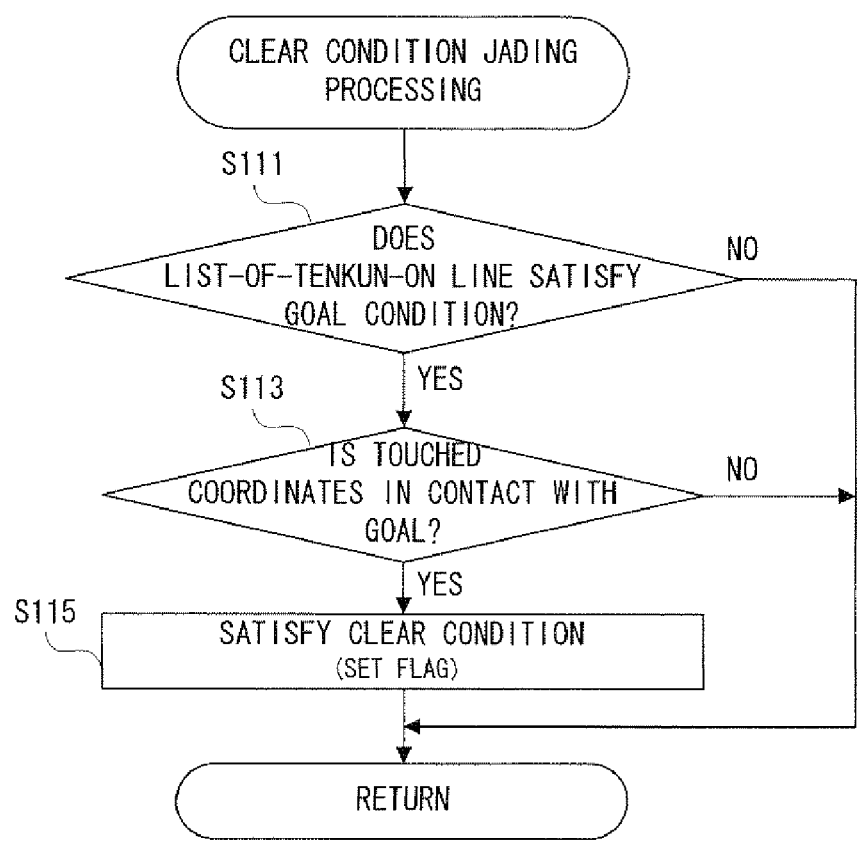
FIG. 23 is a flowchart showing a further part of the operation by the CPU.

The processing in the aforementioned step S17, that is, the clear condition judging processing is according to a subroutine in FIG. 23 in details. Firstly, in a step S111, it is determined whether or not the list-of-tenkun-on a line 84 satisfies the goal condition (Ar) described in the stage information 74. For example, in a case that the goal condition is "(leading end) blue ⇒ red" as shown in FIG. 8(A), the list-of-tenkun-on-a line 84 is changed from "absent" through "blue" to "(leading end) blue ⇒ red" as shown in FIG. 8(B), and when both of the arrays match with each other, it is determined that the goal condition is satisfied (YES). If "NO" in the step Sill (arrays do not match), the process is restored to the main routine.

If "YES" in the step S111, it is determined whether or not the currently touching position (touch information) is in contact with the goal G1 on the basis of the touch information 76 in a step S113, and if "YES", a flag indicating that the clear condition is satisfied is set in a step S115, and then, the process is restored to the main routine.

Here, more specifically, after "YES" in the step S111, the entrance Ent of the goal area G1 is opened as shown in FIG. 10(C), for example, and then, in a step S113, it is determined whether or not the trailing end (currently touching position) of the touch information 76 reaches the entrance Ent of the goal area G1 as shown in FIG. 11(B), for example.

Figure 24:
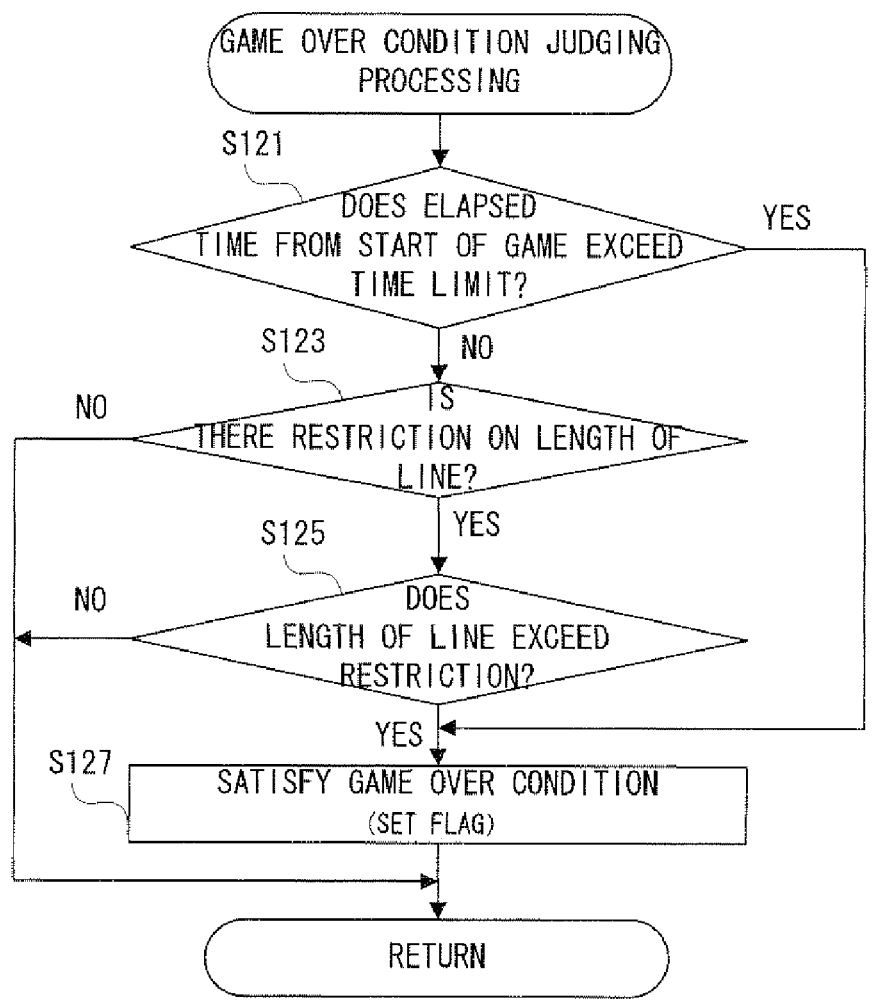
FIG. 24 is a flowchart showing another part of the operation by the CPU.

The processing in the aforementioned step S21, that is, the game over judging processing is executed according to a subroutine in FIG. 24 in details. Firstly, in a step S121, it is determined whether or not an elapsed time from the start of the game exceeds the time limit on the basis of the time information 86, and if "YES", the process proceeds to a step S127. If "NO" in the step S121, it is determined whether or not there is a restriction on the length of the line Ln on the basis of the stage information 74 in a step S123, and if "NO" here as well, the process is restored to the main routine.

If "YES" in the step S123, it is further determined whether or not the length of the line Ln exceeds the restriction of the length on the basis of the line information 78 in a step S125. If the determination result in the step S125 is "NO", the process is restored to the main routine whereas if "YES", the process proceeds to the step S127.

In the step S127, a flag indicating that the game over condition is satisfied is set. Thereafter, the process is restored to the main routine.

As understood from the above description, in this embodiment, the game apparatus 10 has the touch panel 28 for designating an arbitrary position within the screen Sn on which the plurality of moving objects 100 are arranged. The CPU 42 of the game apparatus 10 repetitively detects the position designated with the touch panel 28 under the control of the game program 70 stored in the main memory 48 (S3), draws a line Ln along the detected positions on the screen Sn (S5), every time that the detected position is in contact with any tenkun 100 within the screen Sn, aligns the tenkun 100 on the line Ln (S51, S53), moves the tenkun 100 aligned on the line Ln to the trailing end direction of the line Ln at the velocity V1 (S87) with the drawn line Ln erasing from the leading end at the velocity V2(>V1) higher than the velocity V1(S73), and executes clearing processing (S115) in a case that the array of the tenkun 100 on the line Ln matches with the goal condition array (predetermined array of tenkun Ar) before the leading end of the line Ln catches up with the tenkun 100 on the line Ln, in associated with the processing as to the line erasure and the object movement (S111:YES).

That is, when the player sequentially designates the tenkun 100 moving within the screen Sn with the touch panel 28, the CPU 42 of the game apparatus 10 draws the line Ln on the screen Sn along the designated positions, that is, the locus, and aligns the designated tenkun 100 on the line Ln. Furthermore, the tenkun 100 is moved to the trailing end direction on the line Ln while the line Ln is erased at the velocity (V2>V1) higher than the moving velocity (V1) from the leading end. Then, when the predetermined array of tenkun Ar is formed on the line Ln before the leading end of the line Ln catches up with the tenkun 100 on the line Ln, clearing processing is executed.

Thus, according to this embodiment, the player has to designate a tenkun 100 with the touch panel 28, draw a line Ln, and further align a plurality of tenkuns 100 on the line Ln in a predetermined order, and thus, it is possible to heighten strategic characteristic and savor of the game of aligning a plurality of objects in a predetermined order.

In the above description, the game apparatus 10 is explained, but this invention can be applied to an image processing apparatus installed with a computer (CPU) (PC, PDA, cellular phone, etc. other than game apparatus). This invention can also be applied to a game system for which respective processes are distributedly executed by a plurality of computers, etc.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A non-transitory storage medium storing a game program, wherein
said game program causes a computer of a game apparatus having a position designator which designates an arbitrary position within a screen on which a plurality of moving objects are arranged to perform functionality comprising:
a position detector which repetitively detects a position designated by said position designator;
a line drawer which draws a line on said screen along the position detected by said position detector;
an object aligner which aligns, every time that the position detected by said position detector satisfies a contact condition with any object within said screen, the object on said line;
an object mover which moves the object aligned on the line by said object aligner toward a trailing end direction of said line at a first velocity;
a line eraser which erases the line drawn by said line drawer from a leading end at a second velocity higher than said first velocity; and
a clearer which, before the leading end of said line catches up with the object on said line, if an array of the objects on said line satisfies a matching condition with a predetermined array, in association with the processing by said line eraser and said object mover, executes clear processing configured to clear the object from the screen.

2. The non-transitory storage medium storing a game program according to claim 1, wherein
a goal area is further arranged on said screen,
said clearer executes said clearing processing before the leading end of said line catches up with the object on said line, if an array of the objects on said line satisfies the matching condition with the predetermined array, when the position detected by said position detector satisfies the contact condition with said goal area.

3. The non-transitory storage medium storing a game program according to claim 1, wherein
said game program causes a computer of said game apparatus to further perform functionality comprising a remover which removes, when the line drawn by said line drawer is intersected to make a loop, the loop.

4. The non-transitory storage medium storing a game program according to claim 3, wherein
said game program causes a computer of said game apparatus to further perform functionality comprising a releaser which releases an object existing on said loop in association with a removal of the loop by said remover.

5. The non-transitory storage medium storing a game program according to claim 1, wherein
said plurality of objects are given different colors, and
said array is an array in relation to colors.

6. The non-transitory storage medium storing a game program according to claim 5, wherein
said game program causes a computer of said game apparatus to further perform functionality comprising a separator which separates each of the objects positioned within said loop into a plurality of objects when the line drawn by said line drawer is intersected to make a loop.

7. The non-transitory storage medium storing a game program according to claim 5, wherein
said game program causes a computer of said game apparatus to further perform functionality comprising a combiner which combines a plurality of objects positioned within said loop into one when the line drawn by said line drawer is intersected to make a loop.

8. The non-transitory storage medium storing a game program according to claim 7, wherein
said combiner gives, when said plurality of objects are combined into one, a mixed color obtained by mixing colors of said plurality of objects to the combined object.

9. The non-transitory storage medium storing a game program according to claim 1, wherein
a length restriction is set to the line drawn by said line drawer, and
said game program causes a computer of said game apparatus to further perform functionality comprising a game ender which performs game end processing when the length of the line drawn by said line drawer exceeds said length restriction.

10. The non-transitory storage medium storing a game program according to claim 1, wherein
at least one object within said screen moves so as to run away from the position detected by said position detector.

11. The non-transitory storage medium storing a game program according to claim 1, wherein
at least one object within said screen moves so as to approach the position detected by said position detector.

12. The non-transitory storage medium storing a game program according to claim 1, wherein
when being in contact with a periphery of said screen, said line, or another object, at least one object within said screen turns to a reverse direction, and at least another object within said screen moves so as to go through the periphery of said screen, said line, or another object.

13. The non-transitory storage medium storing a game program according to claim 5, wherein
a dark area is arranged on at least a part of said screen, and an object that enters said dark area is unidentifiable in color.

14. The non-transitory storage medium storing a game program according to claim 13, wherein
a specific part of said object is viewable even in said dark area.

15. The non-transitory storage medium storing a game program according to claim 13, wherein
a viewable area is ensured at a line drawn in said dark area and around said line.

16. The non-transitory storage medium storing a game program according to claim 15, wherein
said viewable area is expanded at a trailing end of said line.

17. A game apparatus, comprising:
a display device configured to display image data
a memory; and
one or more processors operatively coupled to the memory and configured to execute functionality comprising:
a position detector which repetitively detects a position designated by a position designator;
a line drawer which draws a line on a screen along the position detected by said position detector;
an object aligner which aligns, every time that the position detected by said position detector satisfies a contact condition with any object within said screen, said object on said line;
an object mover which moves the object aligned on the line by said object aligner toward a trailing end direction of said line at a first velocity;
a line eraser which erases the line drawn by said line drawer from a leading end at a second velocity higher than said first velocity; and
a clearer which, before the leading end of said line catches up with the object on said line, if an array of the objects on said line satisfies a matching condition with a predetermined array, in association with the processing by said line eraser and said object mover, executes clear processing configured to clear the object from the screen.

18. A game method to be executed by a game apparatus having a position designator which designates an arbitrary position within a screen on which a plurality of moving objects are arranged, comprising:
a position detecting step which repetitively detects a position designated by said position designator;
a line drawing step which draws a line on said screen along the position detected by said position detecting step;
an object aligning step which aligns, every time that the position detected by said position detecting step satisfies a contact condition with any object within said screen, said object on said line;
an object moving step which moves the object aligned on the line by said object aligning step toward a trailing end direction of said line at a first velocity;
a line erasing step which erases the line drawn by said line drawing step from a leading end at a second velocity higher than said first velocity; and
a cleaning step which, before the leading end of said line catches up with the object on said line, if an array of the objects on said line satisfies a matching condition with a predetermined array, in association with the processing by said line erasing step and said object moving step, executes clear processing configured to clear the object from the screen.

19. A game system, comprising:
a display device configured to display image data; and
a game apparatus having one or more processors, and comprising:
a position detector which repetitively detects a position designated by a position designator,
a line drawer which draws a line on a screen of the display device along the position detected by said position detector,
an object aligner which aligns, every time that the position detected by said position detector satisfies a contact condition with any object within said screen, said object on said line,
an object mover which moves, via the one or more processors, the object aligned on the line by said object aligner toward a trailing end direction of said line at a first velocity,
a line eraser which erases the line drawn by said line drawer from a leading end at a second velocity higher than said first velocity, and
a clearer which, before the leading end of said line catches up with the object on said line, if an array of the objects on said line satisfies a matching condition with a predetermined array, in association with the processing by said line eraser and said object mover, executes clear processing configured to clear the object from the screen.

* * * * *